(12) United States Patent
Chambers

(10) Patent No.: US 6,219,615 B1
(45) Date of Patent: Apr. 17, 2001

(54) SATELLITE POSITION FIXING

(75) Inventor: Charles Chambers, Cambridge (GB)

(73) Assignee: ICO Services Ltd., London (GB)

( * ) Notice: Subject to any disclaimer, the term of this patent is extended or adjusted under 35 U.S.C. 154(b) by 0 days.

(21) Appl. No.: 09/048,062

(22) Filed: Mar. 26, 1998

(30) Foreign Application Priority Data

Apr. 1, 1997 (GB) .................................................. 9706599

(51) Int. Cl.[7] .................................................. G06F 165/00
(52) U.S. Cl. ........................ 701/213; 701/207; 701/214; 342/357.01; 342/357.02
(58) Field of Search .................................... 701/207, 213, 701/214, 215, 216, 300; 342/357.01, 357.02, 357.08; 455/12.1

(56) References Cited

U.S. PATENT DOCUMENTS

| | | | |
|---|---|---|---|
| 5,444,450 | 8/1995 | Olds et al. | 342/357.02 |
| 5,490,076 * | 2/1996 | Rawicz et al. | 701/300 |
| 5,515,062 | 5/1996 | Maine et al. | 342/457 |
| 5,592,175 | 1/1997 | Tayloe | 342/357.16 |
| 5,657,232 * | 8/1997 | Ishikawa et al. | 701/213 |
| 5,666,647 | 9/1997 | Maine | 455/12.1 |
| 5,717,406 * | 2/1998 | Sanderford et al. | 342/457 |
| 5,768,640 * | 6/1998 | Takahashi et al. | 396/310 |
| 5,828,336 * | 10/1998 | Yunck et al. | 701/214 |

FOREIGN PATENT DOCUMENTS

| | | |
|---|---|---|
| 0-562-374-A1 | 9/1993 | (EP) . |
| 0 662 758 A2 | 7/1995 | (EP) . |
| 0 803 742 A2 | 10/1997 | (EP) . |
| 8-265239 | 10/1996 | (JP) . |
| 96/21162 | 7/1996 | (WO) . |
| 98/02762 | 1/1998 | (WO) . |

* cited by examiner

Primary Examiner—William A. Cuchlinski, Jr.
Assistant Examiner—Gertrude Arthur
(74) Attorney, Agent, or Firm—McDermott, Will & Emery

(57) ABSTRACT

In a satellite position fixing system, where an earth station 38 communicates with a satellite 10 which, in turn, communicates with selectable ones out of a plurality of user terminals 44 whose position, on the surface of the earth 14, is measured, the accuracy of measurement of the position of the satellite 10 is improved by using all of the user terminals 44 as further triangulation points, the improved position being incorporated in further user terminal 44 position determinations, and so on to create a cumulative improvement. Weighting is applied so that user terminals 44 with large errors in triangulation are given small significance and those with small errors are given great significance.

14 Claims, 17 Drawing Sheets

SATELLITE POSITION FIXING

FIELD OF THE INVENTION

The present invention relates to satellite communication systems, and a method of operating such systems. The invention particularly relates to satellite communication systems and related methods where an earth based user terminal communicates with a satellite which in turn communicates with an earth station, and vice versa. Most particularly, the present invention relates to such a system and its related methods where there is a requirement for the location of the user terminal, on the surface of the earth, to be known to the earth station.

BACKGROUND OF THE INVENTION

It is known, in a satellite communications, for a user terminal, perhaps in the form of a radio telephone handset, not dissimilar to a cellular radio telephone handset, to communicate with an earth station, via a satellite, to establish a telephone call or to receive a telephone call, by means of the earth station linking into the terrestrial wire and cable system or into another radio telephone system.

There are twin purposes relating to establishing the exact position of the user terminal on the surface of the earth. Firstly, in order to know how to direct a radio signal to or from a user terminal, when required, from particular satellite at a particular time, it is necessary to know the approximate location of the user terminal so that the appropriate beam from the appropriate satellite can be selected to cover the portion of the Earth's surface where the user terminal is located. Secondly, in a satellite communication system, in order that call barring, local billing or other restrictions based on the territory wherein the user terminal may be operated can be observed, it is necessary to determine the location of the user terminal with sufficient accuracy for the necessary restrictions to be imposed.

It is known to provide a user terminal where the individual terminal employs "Global Positioning by Satellite" (GPS) to determine, with some great accuracy, the position of the user terminal on the surface of the earth. The user terminal then transmits, to the earth station, via the satellite or satellites involved in communications, its exact position which is then used by the earth station, in subsequent interactions with the user terminal, to control the fiscal and mechanical aspects of the communication activity with the user terminal. An example of such a system is to be found in European Patent EP 0562 374 by Motorola Corporation filed 27th March 1993.

Such systems require multiple frequency capability from the handset, together with enhanced complication of the handset, in order that the handset may be capable both of communications and of GPS measurements.

The present invention seeks to provide a solution to the problem of determining the location of a user terminal or handset, on the surface of the earth, when interacting with a satellite communication system, without the necessity to resort to a solution involving GPS and with sufficient accuracy for the operational and fiscal requirements of a satellite communication system.

A GPS system requires very accurate measured characterisation of the orbits of each satellite so that the position of each satellite can be made known, to a terminal, on the surface of the earth. The terminal itself then calculates its own position. Because the GPS system is one where the satellites alone transmit, information flow is one-way. Measurement of satellite position, which is directly related to the accuracy with which the position of the terminal can be found, is achieved only intermittently by a dedicated facility, and drifting can occur between measurements. The dedicated facility may not be optimally placed on the surface of the earth when the position of the satellite is measured, introducing unwanted errors.

The present invention seeks to provide a continuous updating of the satellite position by exploiting the two-way characteristics of a satellite communications system.

SUMMARY OF THE INVENTION

According to a first aspect, the present invention consists in a system wherein a satellite is operative to cooperate with an earth station to measure and record the position of a terminal on the surface of the earth by reference to an estimated, instant position of said satellite, said earth station being operative to estimated said instant position of said satellite with a first accuracy, said system being characterised by being operative to incorporate the measured position of said terminal to make a re-estimation of said instant position of said satellite with a second accuracy, said second accuracy being greater than said first accuracy.

According to a second aspect, the present invention consists is a method for use in a system wherein a satellite is operative to cooperate with an earth station to measure and record the position of a terminal on the surface of the earth by reference to an estimated, instant position of said satellite, said earth station being operative to estimated said instant position of said satellite with a first accuracy, said method including the steps incorporate the measured position of said terminal in a re-estimation of said instant position of said satellite with a second accuracy, said second accuracy being greater than said first accuracy.

The invention also provides a system and method employing the result of said re-estimation as the new estimated instant position of said satellite when next measuring the position of said terminal. In the preferred embodiment, this provides an improved estimation of the orbit of the satellite and thus contributes to a better measurement of the position of the terminal at the next instance of measurement thereof.

The invention further provides a system and method where the terminal is one of a plurality of terminals, and including measuring and recording the position of each of the plurality of terminals and incorporating the measured position of each of the plurality of terminals to execute the re-estimation in each instance. In the preferred embodiment, this means that the position of the satellite is three-dimensionally triangulated from a vast number of points, possibly numbering thousands, instead of from just a few earth stations.

The invention, still further, provides a system and method where said plurality of terminals can incorporate one or more other earth stations. Since earth stations have their position very accurately known, their contribution to overall accuracy of estimation of the satellite is significant.

The invention further provides a system and method where the re-estimation of the position of the satellite incorporates a weighting function relating to the significance of the accuracy and geometry of the measurement of the position a terminal, the weighting function being employed to give greater favour to those measurements of position of a terminal which contribute most to improving the accuracy of estimation of the instant position of said satellite. In the preferred embodiment, this feature provides that terminal position measurements where there is a great error in measurement of the terminal position, or where there is a great disadvantage in the geometry because the terminal is badly placed relative to the satellite, are given a small weighting and significance in working out the position of the satellite, whereas terminal position measurements with the opposite property are given a greater significance. By downplaying poor results, and by emphasising good results, the estimation of the position of the satellite is better improved.

The invention, still further, provides a system and method wherein the weighting is incorporated in the re-estimation by providing the accuracy of measurement and the quality of the geometry as state variable inputs to a Kalman filter algorithm.

Finally, the invention provides a system and method where the earth station is one of a plurality of earth stations, each of the plurality of earth stations sharing information concerning the re-estimation. This means that, should the satellite pass from one earth station to another, the improvement in the estimation of its position is inherited by the successor earth station and continues to be updated and improved by the successor earth station.

BRIEF DESCRIPTION OF THE DRAWINGS

The invention is further explained, by way of example, by the following description, taken in conjunction with the appended drawings, in which.

DETAILED DESCRIPTION

In the first part of the description of the preferred embodiment, various methods are shown whereby a communications satellite can measure the position of a user terminal on the surface of the earth, in order to illustrate the improvement represented by the present invention.

Figure 1:
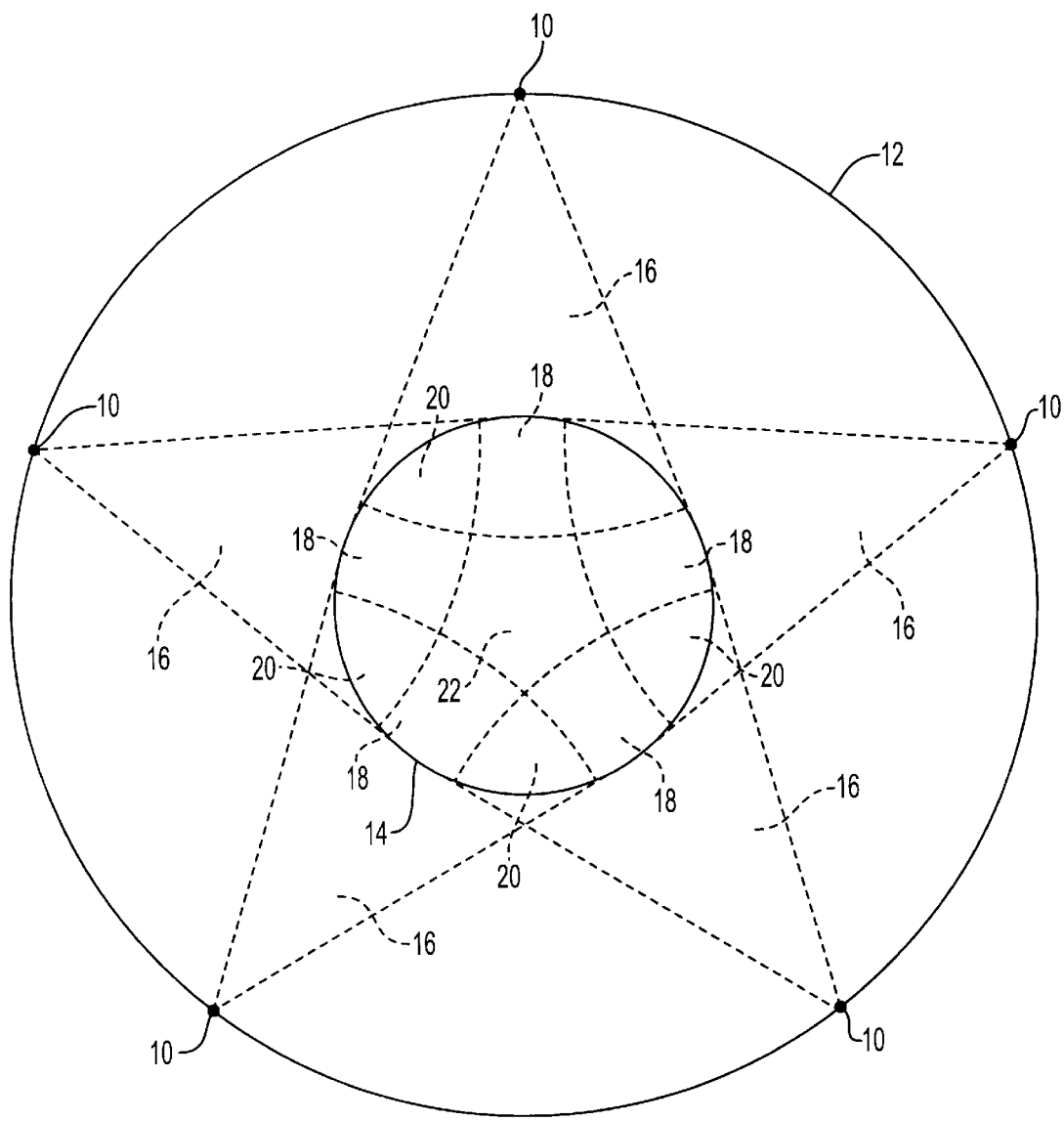
FIG. 1 shows a planar constellation of satellites disposed about the earth.

Attention is firstly drawn to FIG. 1. FIG. 1 shows a planar constellation of satellites disposed about the earth. The plurality of satellites 10 are evenly disposed around a circular orbit 12 above the surface of the earth 14. Each of the satellites 10 is designed to provide radio communications with apparatus on the surface to the earth 14 when the individual satellite 10 is more than 10 degrees above the horizon. Each satellite 10 therefore provides a cone 16 of radio coverage which intersects with the surface of the earth 14.

The surface of the earth has three types of areas. A first type of area 18 is one which has radio coverage from only one satellite 10. A second type of area 20 is an area where there is radio coverage from more than one satellite 10. Finally, a third type of area 22 receives radio coverage from none of the satellites 10 in the orbit 12 shown.

Figure 2:
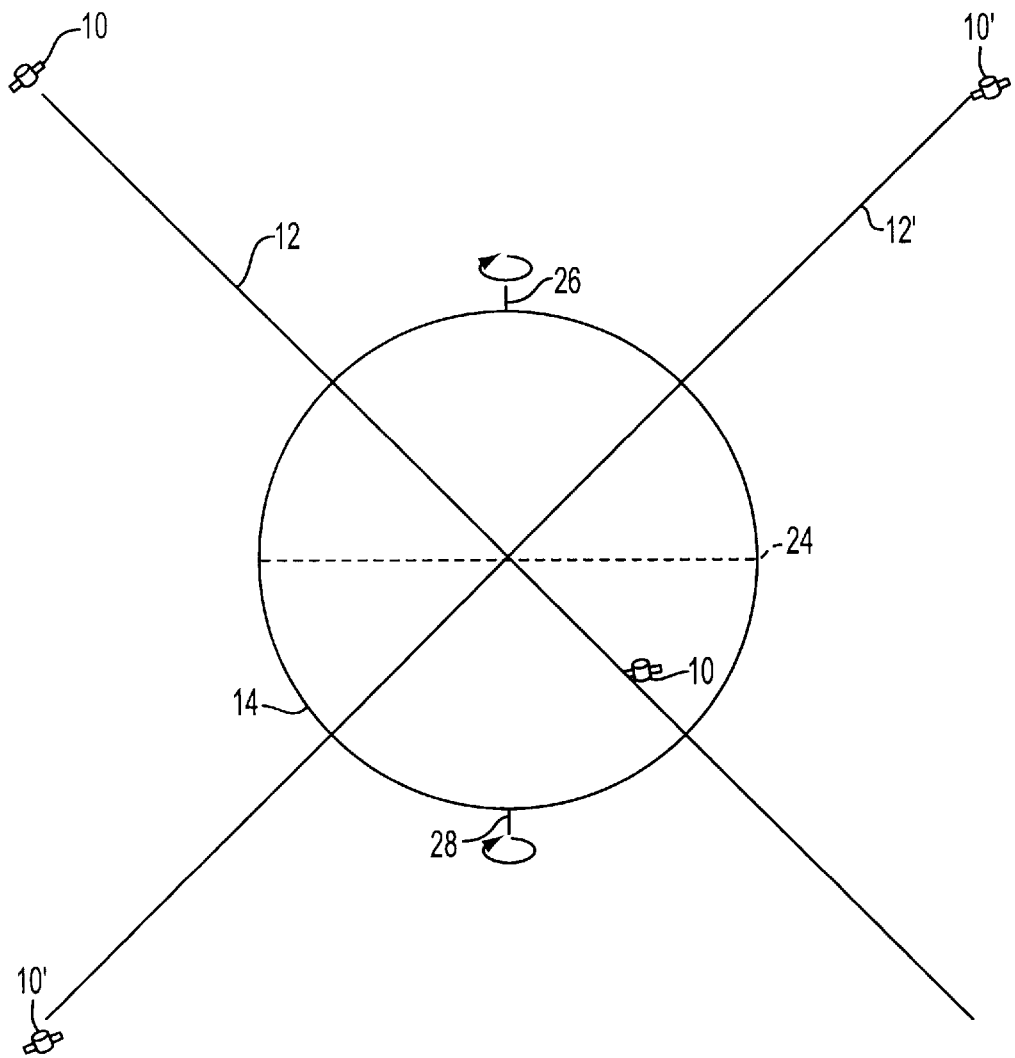
FIG. 2 illustrates how the satellites are disposed in orthogonal orbital planes.

FIG. 2 illustrates how the satellites 10 are disposed in orthogonal orbital planes. The first orbit 12 of FIG. 1 is supplemented by a second orbit 12' having satellites 10 disposed there about in a similar manner to that shown in FIG. 1. The orbits 12' are orthogonal to one another, each being inclined at 45 degrees to the equator 24 and having planes which are orthogonal (at 90 degrees) to each other.

In the example shown, the satellites 10 orbit above the surface of the earth 14 at an altitude of 10 500 km. Those skilled in the art will be aware that other orbital heights and numbers of satellites 10 may be used in each orbit 12, 12'. This configuration is preferred because the example provides global radio coverage of the earth 14, even to the north 26 and south 28 poles, with a minimum number of satellites 10. In particular, the orthogonality of the orbits ensures that the satellites 10 of the second orbit 12' provides radio coverage for the third types of area 22 of no radio coverage for the satellites in the first orbit 12, and the satellites 10 in the first orbit 12 provide radio coverage for those areas 22 of the third type where the satellites 10 of the second orbit 12' provide no radio coverage.

It will become clear that, although the two orbits 12, 12' are here shown to be of the same radius, the system, as hereinbefore and hereinafter described will function with orbits 12, 12' of different radii. Equally, there may be more than two orbits 12, 12'. So far as the present system is concerned, the only requirement is that every part of the surface of the earth 14 is in receipt of radio coverage from at least one satellite 10 at all times.

Figure 3:
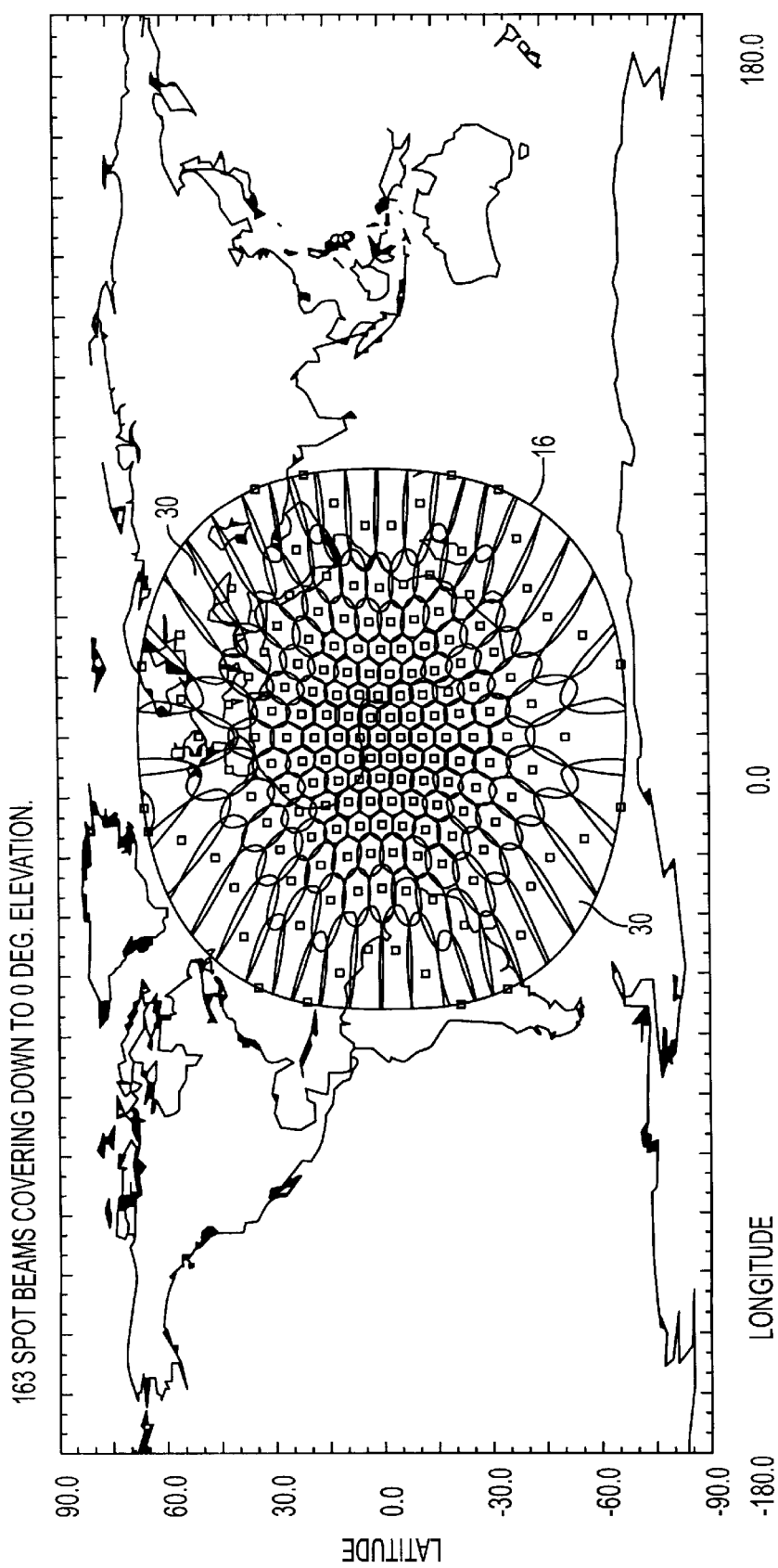
FIG. 3 shows the structure of the cone of radio coverage provided by each satellite.

FIG. 3 shows the structure of the cone 16 of radio coverage provided by each satellite 10. For convenience, the radio coverage cone 16 is shown centred, on a map of the earth, at latitude 0 degrees at longitude 0 degrees. The cone 16 of radio coverage is divided into a plurality of spot beams 30, by means of a corresponding plurality of directional antennae on the satellite 10. The satellite 10 is intended for mobile radio telephone communications and each of the spot beams 30 corresponds, roughly, to the equivalent of a cell in a cellular radio telephone network. In FIG. 3, the cone of radio coverage 16 is distorted due to the geometry of the map of the earth's surface provided. FIG. 3 also shows the extent of interaction of the cone 16 of radio coverage down to the edges of the cone 16 being tangential to the earth's surface, that is, to the point where the cone 16 represents a horizontal incidence at its edges, with the surface of the earth. By contrast, FIG. 1 shows the cone 16 at a minimum of 10 degrees elevation to the surface of the earth.

It is to be observed, that because of the curvature of the earth, the spot beams 30 are of near uniform, slightly overlapping circular shape at the centre whereas, at the edges, the oblique incidences of the spot beams 30 onto the surface of the earth 14 causes considerable distortion of shape.

Figure 4:
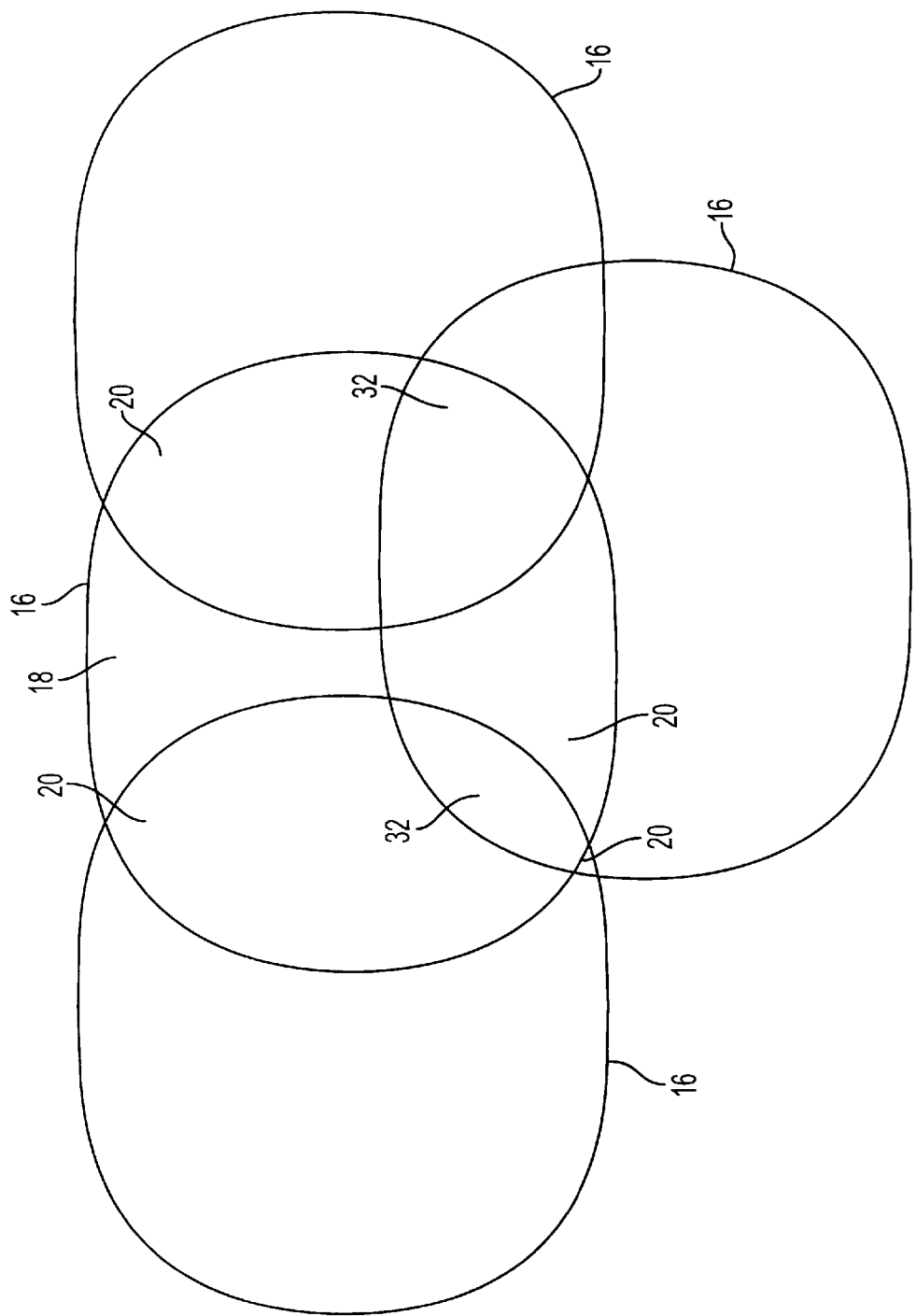
FIG. 4 shows how the cones of radio coverage, shown in FIG. 3 may interact with the surface of the earth to produce many types of different regions.

FIG. 4 shows how the cones 16 of radio coverage may interact with the surface of the earth to produce many types of different regions. As discussed with reference to FIG. 1, numerous cones or radio coverage 16 may overlap to produce first areas 18 where there is radio coverage by only one satellite, second areas 20 where there is radio coverage by two satellites, and even fourth areas 32 where coverage is provided by three or more satellites. It is to be understood that each of the cones 16 of radio coverage represented in FIG. 4 is divided, as shown in FIG. 3, into its own independent set of spot beams 30.

Figure 5:
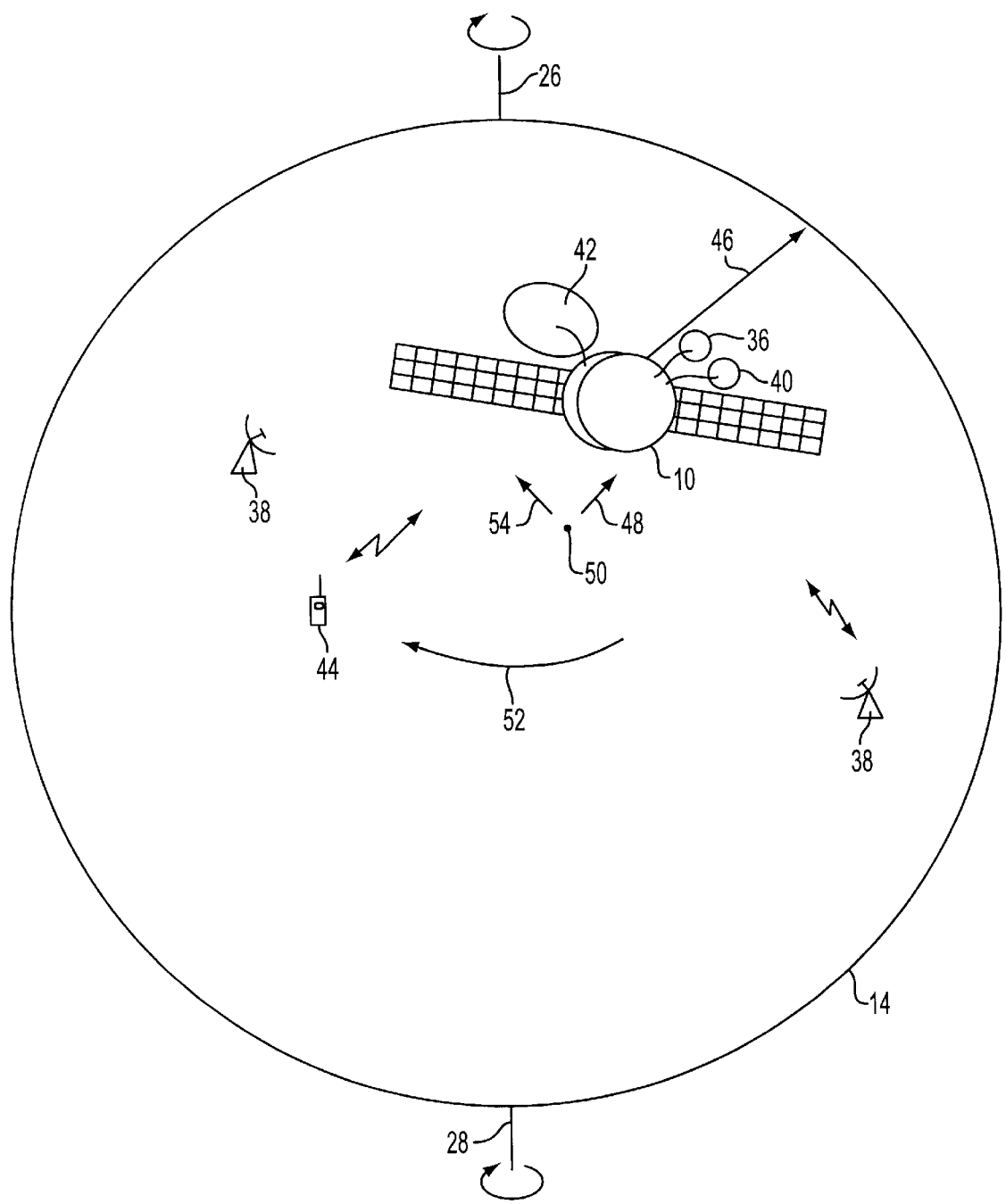
FIG. 5 is a view, from above, of a satellite above the surface of the earth, illustrative of the various motions relative to the earth.

FIG. 5 is a view, from above, of a satellite 10 above the surface of the earth. The satellite 10 comprises solar panels 34 for power supply, a downlink antenna 36 for sending bulk telephone traffic to one of a plurality of earth stations 38, and uplink antenna 40 for receiving general traffic from the earth stations 38, and a subscriber antenna 42 which provides the plurality of spot beams 30, shown in FIG. 3, intended to provide communications with user terminals 44 which may be provided in a form not dissimilar to a hand held cellular radio telephone. It is to be understood that the user terminal 44 may also comprise more elaborate vehicle mounted equipment for use in land vehicles, ships and aircraft.

With the parameters mentioned in this preferred example, the satellite moves around its orbit 12 12', as indicated by a first arrow 46, with a velocity of 4.9 km per second. Ignoring for the moment the rotation of the earth 14, the spot beams 30 also move across the surface of the earth 14 with a similar velocity along a ground track as indicated by a second arrow 48. The point immediately beneath the satellite, is known as the nadir 50.

At the same time the earth 14 is rotating, at its equator with a velocity of 0.47 km per second, as indicated by a third arrow 52. Directions, relative to the ground track 48, at 90 degrees thereto, are termed crosstrack as indicated by a fourth arrow 54. Hereinafter, the position of the user terminal 44 is defined with reference to its distance along the ground track 48 and its distance along the cross track 54 with reference to the nadir 50.

Figure 6:
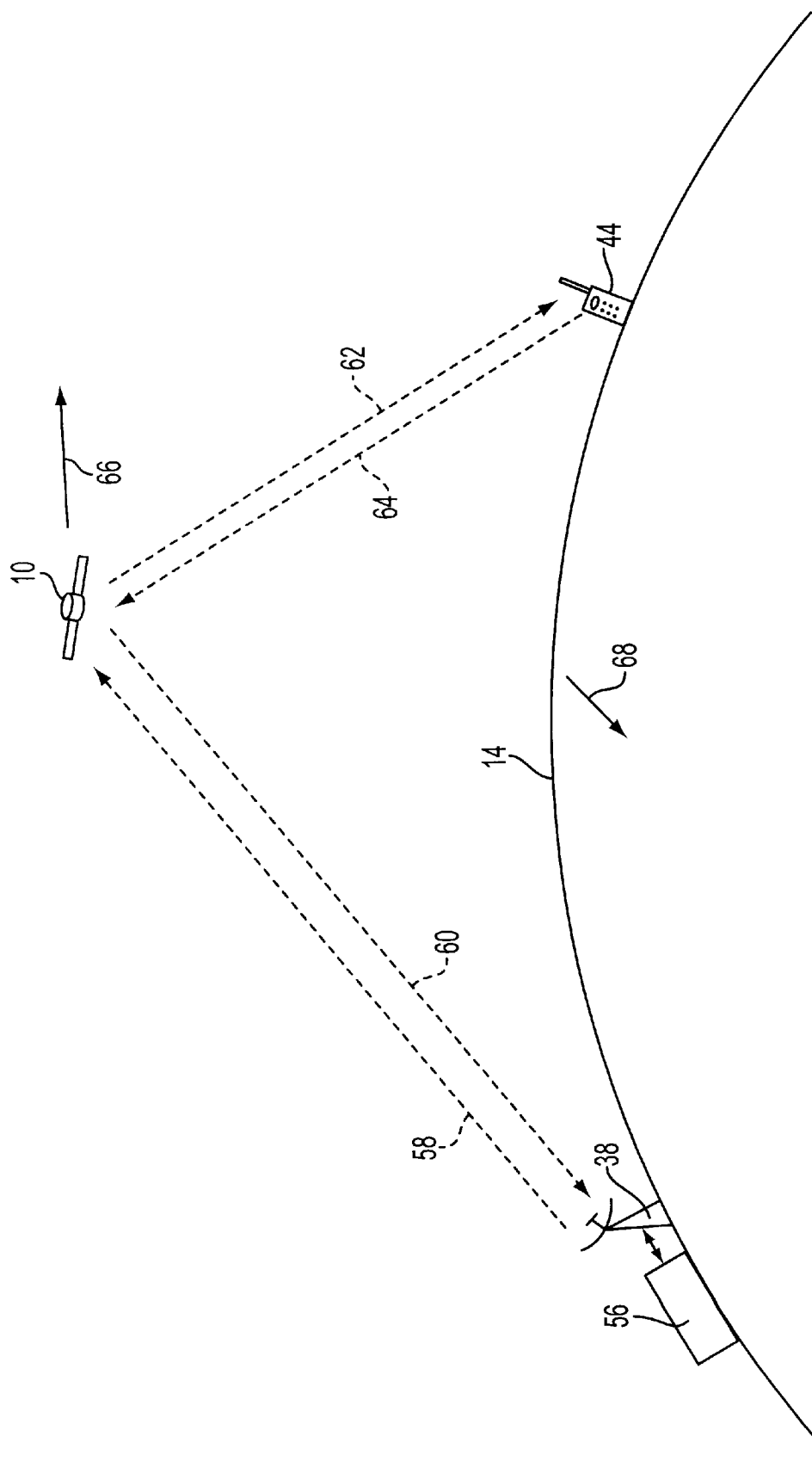
FIG. 6 is a schematic view of the general situation where an earth station talks to a user terminal via the satellite to determine propagation delays between the user terminal and the satellite.

FIG. 6 is a schematic view of the general situation where an earth station 38 talks to a user terminal 44 or via the satellite 10. The earth station 38 further comprises an earth station controller 56 which controls the activity of the earth station 38. The earth station 38 is located at a first point on the surface of the earth 14 and the user terminal 44 may be at any other point on the surface of the earth within range of the satellite 10 when the satellite 10 is in range of the earth station 38.

The earth station 38 communicates with the satellite 10 via an uplink radio link 58, via the uplink antenna 40 of FIG. 5, using frequencies in the band 5150 to 5250 megahertz. The earth station 38 receives signals from the satellite 10 via the downlink antenna 36 of FIG. 5 on a downlink radio link 60 using signals in the frequency range 6975 to 7075 megahertz.

The user terminal 44 receives signals from the satellite 10 via a user terminal downlink 62 using frequencies in the range 2170 to 2200 megahertz. The user terminal 44 sends messages and signals to the satellite 10 via a user terminal uplink 64 operating in the frequency band 1980 to 2010 megahertz. These frequencies are merely exemplary and those skilled in the art will be aware from the following description, that the system could be implemented using numerous other frequencies for the uplinks and downlinks.

Implicit in FIG. 6, but not specifically shown, is the fact that satellite 10 contains its own precise oscillator, conveniently in the form of a crystal oscillator, which the satellite 10 uses for converting the frequencies of incoming and outgoing signals and for use as a frequency reference when synthesising frequencies. Likewise, the user terminal 44 contains its own internal synthesised oscillator, working from a master oscillator, preferable a crystal oscillator, for converting frequencies of incoming signals and synthesising the frequencies of outgoing signals.

Equally, the earth station 38 and the earth station controller 56 between them contain, or have access to, extremely precise frequency references and time references. These references may actually be contained within the earth station 38 and the earth station controller 56, or may be derived from elsewhere via a land line or other service.

The exact location, on the surface of the earth 14, of the earth station 38, is known with great precision. Likewise, the parameters or the orbit 12 12' of the satellite 10 and its position in that orbit, at any instant, are also known with great precision. The uncertain element, which is the purpose of the present system to resolve, is the position of the user terminal 44 on the surface of the earth 14.

Not previously mentioned, is the fact that the user terminal 44 transmits on the user terminal uplink 64 to the subscriber antenna 42 and similarly receives on the user terminal downlink link 62 from the subscriber antenna 42. The satellite 10 will only be in communication with one earth station 38 at a time, but may be in communication with a great many user terminals 44. Each user terminal will be in one particular spot beam 30 of the plurality of spot beams shown in FIG. 3.

The satellite 10 will be moving relative to the surface of the earth 14, and therefore relative to the earth station 38 and to the user terminal 44, as indicated in a fifth arrow 66. Likewise, the surface of the earth 14 will be moving relative to the orbit 12 12' of the satellite 10 as generically indicated by a sixth arrow 68.

The signals exchanged between the earth station 38 and the satellite 10, in common with the signals exchange between the user terminal 44 and the satellite 10, all enjoy a propagation delay and a frequency shift, due to the motion of the satellite 10 relative to the earth station 38 and to the user terminal 44 caused by the doppler effect. The present system in part concerns itself with means of employing the doppler shift in frequencies, due to the motion of the satellite 10, and measurement of the propagation delay, to determine the position of the user terminal 44 on the surface of the earth 14.

In the present system, propagation delay is measured between the earth station 38 and the user terminal 44. The earth station 38 sends out a signal on the uplink radio link 58 to the satellite 10 which is, in turn, sent to the user terminal 44 via the user terminal downlink 62. Upon receipt of the signal from the earth station 38, the user terminal waits for a predetermined period and then sends its own message, via the user terminal uplink 64 and the downlink radio link 60, back to the earth station 38. The earth station controller 56 notes the elapse of time from the instant that the earth station 38 began to transmit the message on the uplink radio link 58 and the instant when the earth station 38 began to receive the response message from the user terminal 44 from the downlink radio link 60. The earth station controller 56 knows the propagation delay times for signals, through the satellite 10, from the uplink radio link 58 onto the user terminal downlink 62 and, correspondingly, the propagation delay through the satellite 10 between the user terminal uplink 64 and the downlink radio link 60. Equally, the earth station controller 56 knows, with precision, the predetermined elapsed time employed by the user terminal 44 before it responds to the received message from the earth station 38. These propagation delays and the predetermined delay of the user terminal 44 are subtracted, by the earth station controller 56, from the overall elapsed time to determine the actual propagation delay of the radio wave via the various links 58, 60, 62, 64 in the return journey of the message from and to the earth station 38. The radio wave propagates always at the speed of light, which is constant. Because the position of the earth station 38, on the surface of the earth, is precisely known, and because the position of the satellite 10 in its orbit 12 12' is also precisely known, the sum of the propagation delays on the uplink radio link 58 and the downlink radio link 60 can be precisely calculated. The earth station controller 56 is already aware of the over all elapsed time for the propagation of the message along the radio paths 58, 60, 62, 64. By subtracting the calculated delay on the radio path 58 60 between the earth station 38 and the satellite 10 from the overall propagation delay, the propagation delay between the user terminal 44 and the satellite 10 may be precisely measured. This means that, since the propagation is entirely at the speed of light, the linear distance between the satellite 10 and the user terminal 44 is known. According to the propagation delay, the user terminal may exist on any point of a spherical surface centred on the satellite 10. Because the spherical surface intersects the surface of the earth 14, and the user terminal 44 is on the surface of the earth, the location of the user terminal 44 may be inferred as being on the line intersection of the spherical surface of the earth 14 and the sphere of measured distance centred on the satellite 10.

Figure 7:
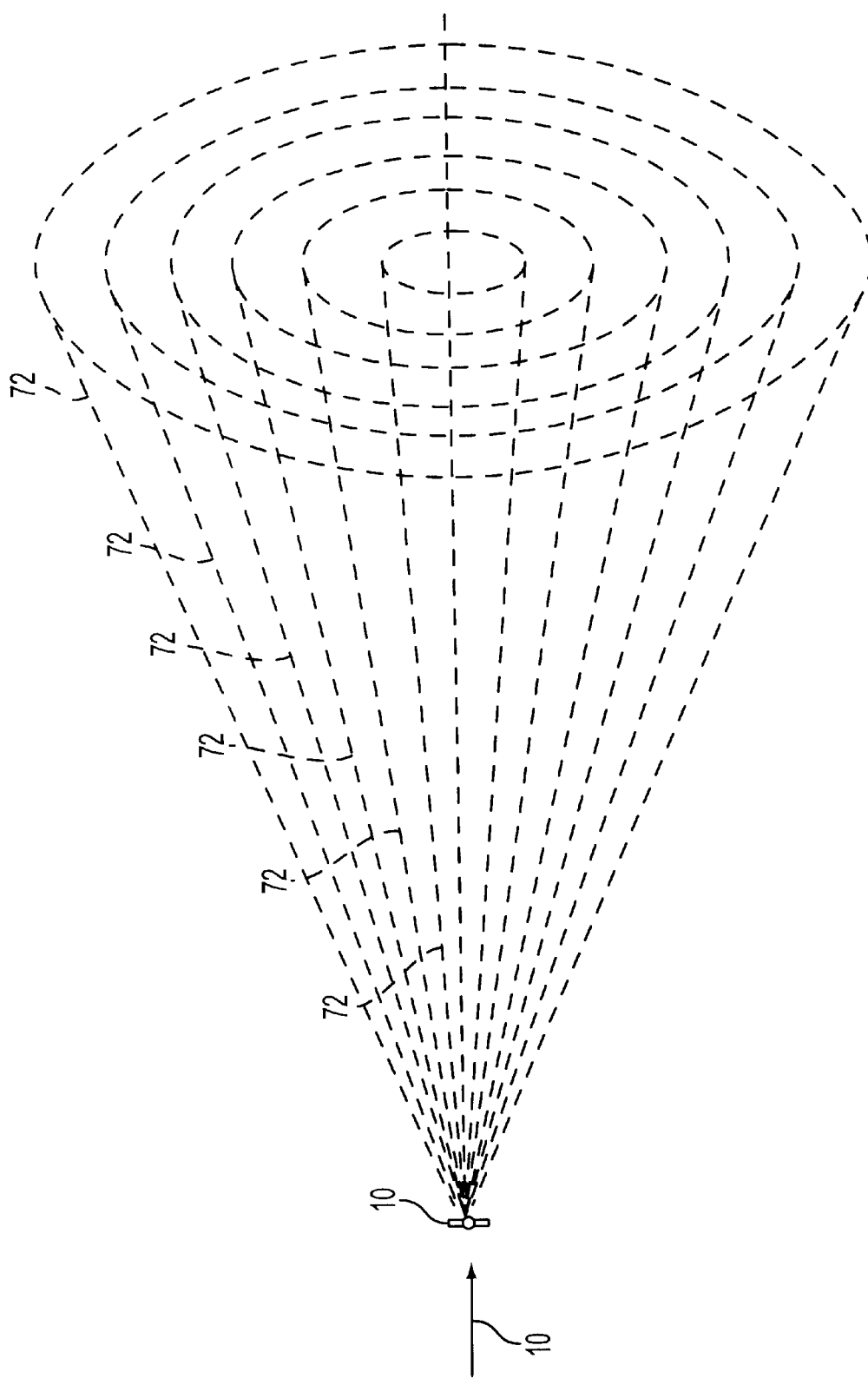
FIG. 7 shows the geometry of doppler frequency shift measurement for the satellite.

FIG. 7 shows the geometry of doppler frequency shift measurement for the satellite 10. As the satellite 10 moves as indicated by a 7th arrow 70, the change in frequency of a radio signal sent from the satellite 10 and the perceived frequency of a radio signal received by the satellite 10 from a fixed source such as the user terminal 44, depends upon the cosine of the angle between the satellite 10 and the recipient of a transmitted radio signal from the satellite or the source of a transmitted radio signal to the satellite 10. Accordingly, if we plot those regions in space for pre-determined doppler frequency changes, there is obtained a series of coaxial cones 72 having the satellite 10 at their collective apex, extending towards infinity, and having, as their collected axis 74, the direction of the motion of the satellite 10 as indicated by the 7th arrow 70. FIG. 7 shows the cones 72 extending only for a finite distance. It is to be understood that the cones 72 are of infinite extension. Likewise, FIG. 7 has only shown the cones "in front" of the satellite for radio frequencies receivers or sources which the satellite 10 is approaching. It is to be understood that a corresponding set of coaxial cones 72 extend "behind" the satellite, having the same apex and axis. The doppler shift "in front" of the satellite 10 is shown by an increase in frequency. The doppler shift "behind" the satellite 10 is provided by a corresponding decrease in frequency.

Where the cones 72 cut the surface of the earth 14, for a particular doppler frequency shift, defines a further line along which the user terminal 44 may be located.

Referring again to FIG. 6, a doppler frequency shift measurement is executed by the earth station 38 providing a signal of known frequency on the uplink radio link 58. The satellite 10, using its own internal oscillator, translates the frequency of the signal and provides it on the user terminal downlink 62. The user terminal 44 then returns the signal via the user terminal uplink 64, once again to be converted in frequency by the internal oscillator of the satellite 10 and sent back to the earth station 38 via the downlink radio link 60. The earth station controller 56 measures the frequency of the downlink radio link 60 signal and deduces the doppler frequency shift, at the user terminal 44, resulting from the motion of the satellite 10 as indicated by the 5th arrow 66.

Figure 8:
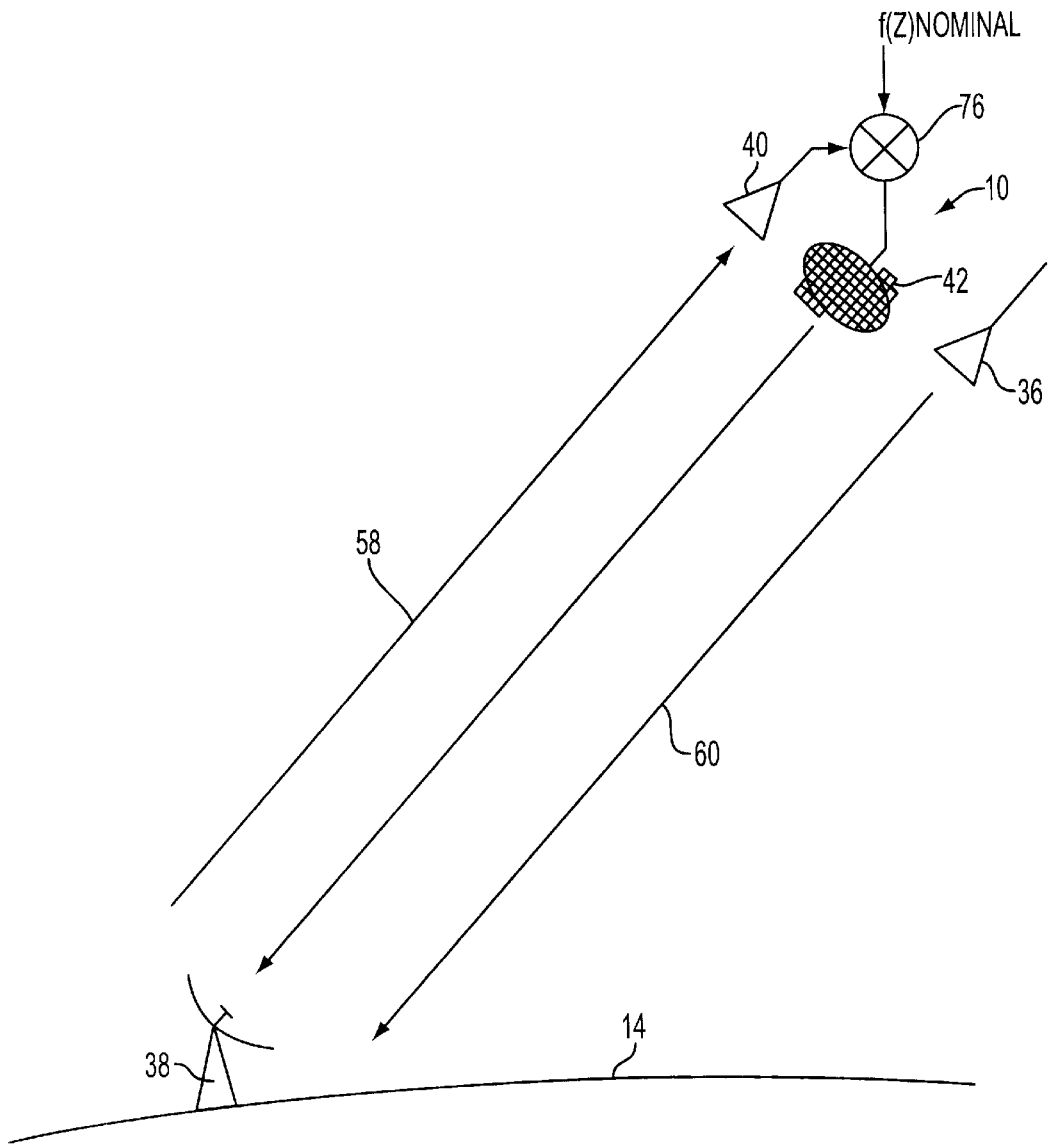
FIG. 8 is a schematic representation of the exchange of test signals between the earth station and the satellite to determine the relative doppler shift and internal oscillator error of the satellite.

FIG. 8 is a schematic diagram of the manner in which the earth station 38 and the earth station controller 56 interact with the satellite 10 to calibrate the errors and doppler shift experienced between the earth station 38 and the satellite 10.

The earth station 38 sends a signal of know frequency f(1) on the uplink radio link 58 to the satellite 10. The satellite 10 has an internal master oscillator which controls all of the synthesised frequencies used by satellite 10. If the master oscillator has a proportional error m, then any frequency, synthesised using the master oscillator, in the satellite, is proportionally in error, so that:

$$f(\text{actual}) = (1+m)f(\text{intended})$$

Likewise, the satellite 10 is moving with respect to the earth station 38, thus introducing a proportional doppler shift, let us call it d, so that, no matter whether the signal goes from the earth station 38 to the satellite 10, or from the satellite 10 to the earth station 38:

$$f(\text{received}) = (1+d)f(\text{sent})$$

Thus, if the earth station sends a frequency f(1) on the uplink radio link 58 to the satellite 10, because of doppler shift the satellite receives a frequency $$f(\text{received at satellite}) = f(1)(1+d)$$

Now, the satellite employs a frequency changer 76 to convert the signal, received from the earth station 38, to a frequency suitable for use via the subscriber antenna 42. In order so to do, the satellite 10 synthesises an intended frequency f(2) to be subtracted from frequency of the signal received at the satellite 10 from the earth station 38. The intended frequency f(2) is subject to the proportional error in the master oscillator on the satellite 10, and so becomes f(2)(1+m).

The output of the frequency changer 76 is thus:

$$f(1)(1+d)-f(2)(1+m)$$

and this is sent, back to the earth station 10, via the subscriber antenna 44. But the satellite 10 is moving, and thus imparts a further doppler shift. Thus, the frequency, received by the earth station 38 from the subscriber antenna 42, let us call it f(R1), is given by $$f(R1)=(1+d)(f(1)(1+d)-f(2)(1+m))$$

The earth station controller 56 measures f(R1) with extreme precision. Thus, f(R1), f(1) and f(2) are all known numbers, but m and d are unknown. Expanding the expression for f(R1) we obtain $$f(R1)=(f(1)-f(2))+d(2f(1)+d^2f(1))-mdf(2)-f(2)m$$

The second order terms $d^2f(1)$ and mdf(2) are insignificant compared to the other terms, and can be ignored.

Thus $f(R1)=f(1)-f(2)+d(2f(1)+(2)-mf(2))$

The satellite 10 synthesises a third signal, with frequency f(3), which it sends via the downlink radio link 60 to the earth station 38. The third signal f(3) is subject to the proportional error of the master oscillator in the satellite 10. Thus, the actual frequency sent on the downlink radio link 60 becomes:

$$(1+m)f3$$

Since the satellite 10 is moving, the signal on the downlink radio link 60 is also subject to doppler shift. The frequency, f(R2), received at the earth station 38 on the downlink radio link 60 is thus given by:

$$f(R2)=(1+d)(1+m)f(3) \text{ thus } f(R2)=f(3)+df(3)+mf(3)+mdf(3)$$

The second order term mdf(3) is very small compared to the other terms and can be ignored. This leaves the following equations.

$$f(R1)=f(1)-f(2)+d(2f(1)-f(2))-mf(2) \text{ and } f(R2)=f3(1+d+m)$$

Now, f(1), f(2) and f(3) are precisely know numbers and f(R1) and f(R2) are accurately measured and thus known. This reduces the equations to being two simultaneous equations in two unknowns, namely m and d, which can thus be solved for the unknowns.

Figure 9:
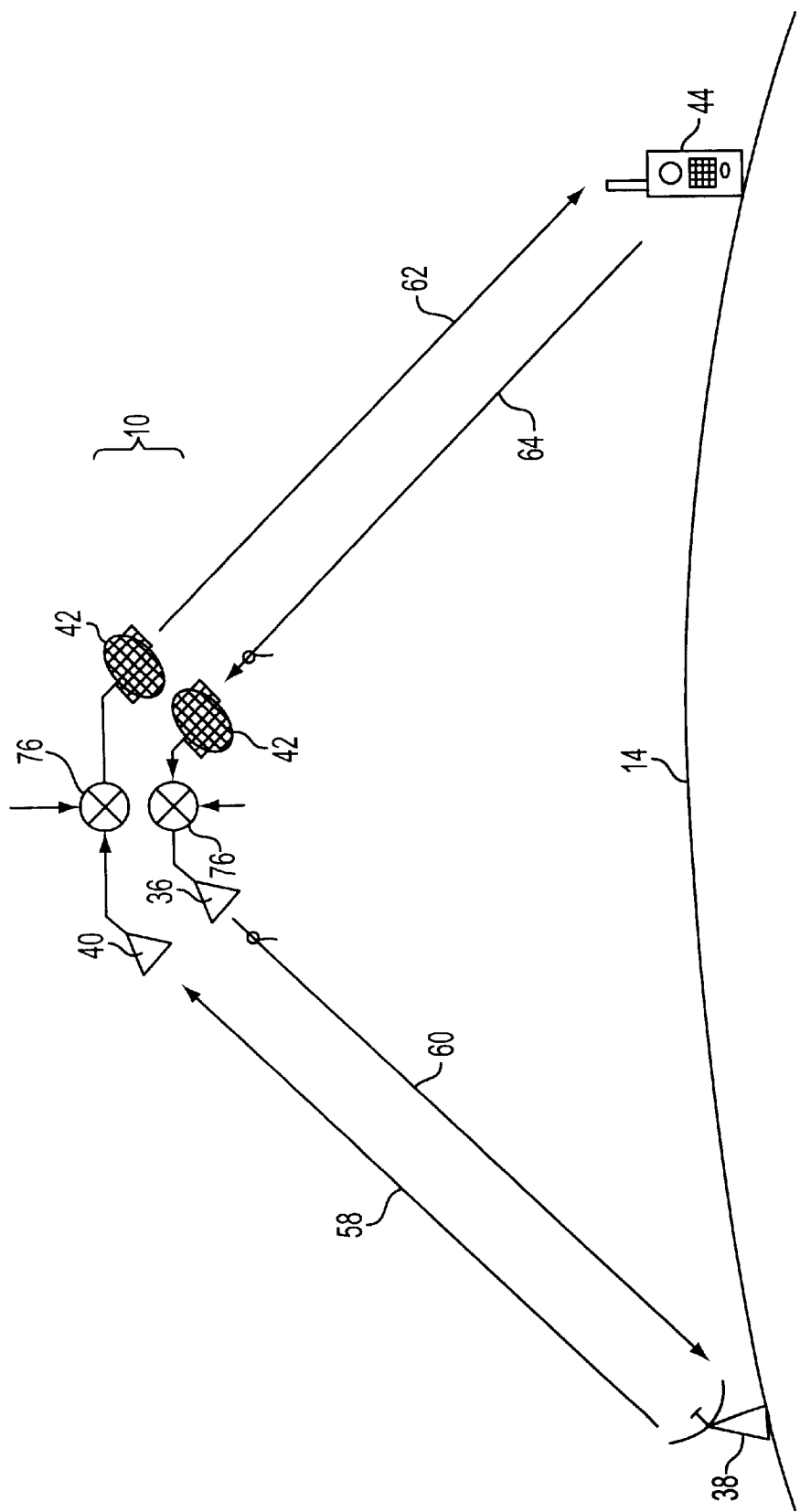
FIG. 9 is a schematic representation of how a calibrated satellite, according to FIG. 8, may, in turn, be used to determine the relative doppler shift between the satellite and user terminal and the internal oscillator error in the user terminal.

FIG. 9 is a schematic view of how the earth station 38 measures the proportional doppler shift error and master oscillator error on the user terminal 44.

The earth station 38 and the earth station controller 56 first 'calibrate' the satellite 10 as described with reference to FIG. 8. Being able to predict the behaviour the satellite 10, the earth station 38 effectively moves its point of operation from the surface of the earth 14 and places it at the satellite 10. The satellite 10 will show a different doppler shift with respect to the earth station 38 than it displays with respect to the user terminal 38.

The subscriber antenna 42 and the frequency changer 76 are shown twice in the satellite 10 simply to indicate that two paths exist, where the earth station 38 receives signals from the user terminal 44 via the satellite 10 and the earth station 38 sends signals to the user terminal 44 via the satellite 10.

Firstly, the earth station 38 sends a signal on the uplink 58 which is transposed by the frequency changer 76 and sent down on the user terminal downlink 62 to the user terminal 44. The user terminal 44 makes a measurement of the signal on the user terminal downlink 62, transposes its frequency by a nominal fixed amount and resends the transposed signal on the user terminal uplink 64 to the satellite 10 via the subscriber antenna 42 to be transposed via the mixer 76 and sent, via the downlink radio link 60, to the earth station 38 where the earth station controller 56 makes an accurate frequency measurement. The user terminal 44 also makes an independent transmission, via the satellite, as described, at a nominal frequency, known to the earth station 38 and its controller 56.

A moment of reflection will show that precisely the same method has been used by the earth station 38, extended via the 'calibrated' satellite 10, to measure the errors of the user terminal 44, as the earth station 38 used to 'calibrate' the satellite. There has been one loop—back frequency measurement, and one independent signal at a nominal synthesised frequency. The earth station controller 56 corrects for the 'calibration' of the satellite, and once again works out the two equations in two unknowns to solve for the satellite 10 to user terminal 44 doppler shift and to solve for the proportional error in the master oscillator in the user terminal 44.

Figure 10:
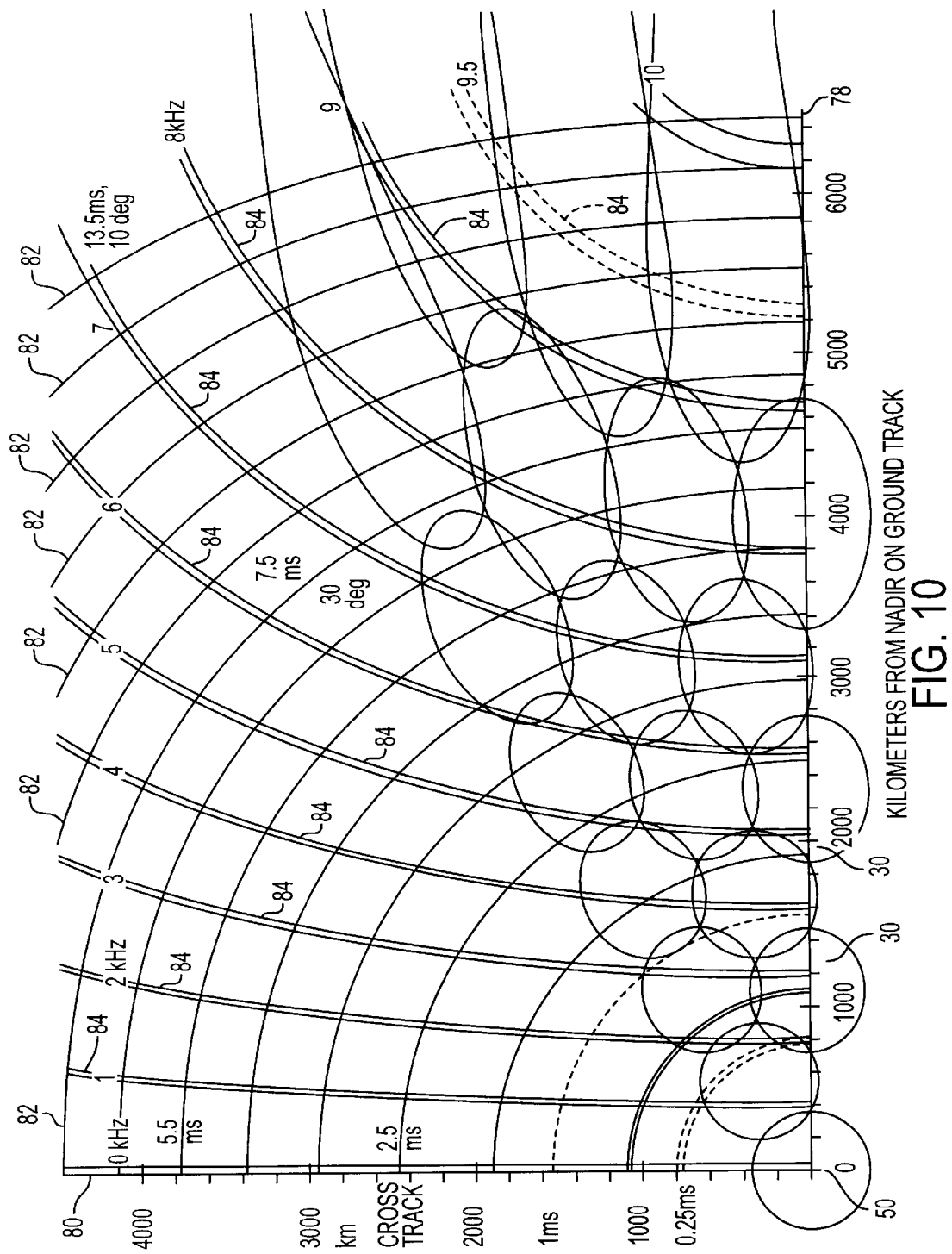
FIG. 10 shows how intersecting lines of measured doppler frequency shift and propagation delays may be used to measure the position of the user terminal on the surface of the earth.

FIG. 10 shows how measurement of Doppler frequency shift and delays can be used to locate a user terminal 44 on the surface of the earth 14.

In FIG. 10, the horizontal axis 78 corresponds to measurement in the direction of the second arrow 48 of FIG. 5 along the ground track. The vertical axis 80 corresponds to measurement along the cross track as indicated by the fourth arrow 54 in FIG. 6.

Only one quadrant is shown. It is to be understood that the pattern, as shown, is symmetrical about the axes in all four quadrants.

The delay measurements, described with reference to FIG. 6, create a series of delay contours 82, approximating to circles centred on the nadir 50 which corresponds to the point 00 in FIG. 10. Whereas the delay contours 82 represent the intersections of spheres of constant delay centred on the satellite, doppler contours 84 represent the lines of intersection of the plurality of coaxial cones 72 described in relation to FIG. 7. The Figures given for the doppler contours relate to the doppler shift, in milliseconds, corresponding to the position, on the surface of the earth 14, where the user terminal 44 might be situated. Likewise, the Figures adjacent to the delay contours 82 indicate the particular delay in milliseconds, for that particular delay contour 82 and that was the particular position on the surface of the earth 14. Various Figures are shown in degrees, being the angle of elevation from the user terminal 44 to the satellite 10 if it were in that location. FIG. 10 extends out to a minimum elevation of 10 degrees, which, in this instance, is the operational minimal of the satellite communications system which holds the example given as the preferred embodiment of the present invention.

Also shown in FIG. 10, overlaid, are some of the spot beams 30 described with reference to FIGS. 3 and 4.

It is to be understood that spot beams 30 fill the entirety of the four quadrants. Only a few spot beams 30 have here been shown to avoid undue cluttering and complication of FIG. 10.

Essentially, on the basis of a single delay measurement as described with reference to FIG. 6, and a single Doppler frequency shift measurement as described with reference to FIGS. 8 and 9, it is possible to estimate the position of the user terminal 44 on the surface of the earth 14 at that point where its particular delay contour 82 and Doppler contour 84 cross.

Because there exist 4 quadrants, there is a degree of ambiguity in determining which of the four quadrants the user terminal 44 might be situated. This is resolved by noting which of the plurality of spot beams 30 received the signal from the user terminal 44.

It is to be observed, in FIG. 10, that the Doppler contours 84 are in fact drawn as a pair of lines rather than a single line. This is to represent the proportional error in the measurement. Close to the nadir 50, the lines in the doppler contour 84 are close together indicating a small positional error. By contrast, at large distances along the ground track shown by the horizontal axis 78, the pairs of lines in the doppler contours 84 become wider apart indicating a greater error. By contrast, although the delay contours 82 are also pairs of lines indicating an uncertainty, in the accuracy of the measurement, the pairs of lines in the delay contours are much closer together.

In order to overcome the rather large errors in the doppler contours 84 at great distances along the ground track as indicated by the horizontal likes of 78, an averaging process in undertaken.

Figure 11:
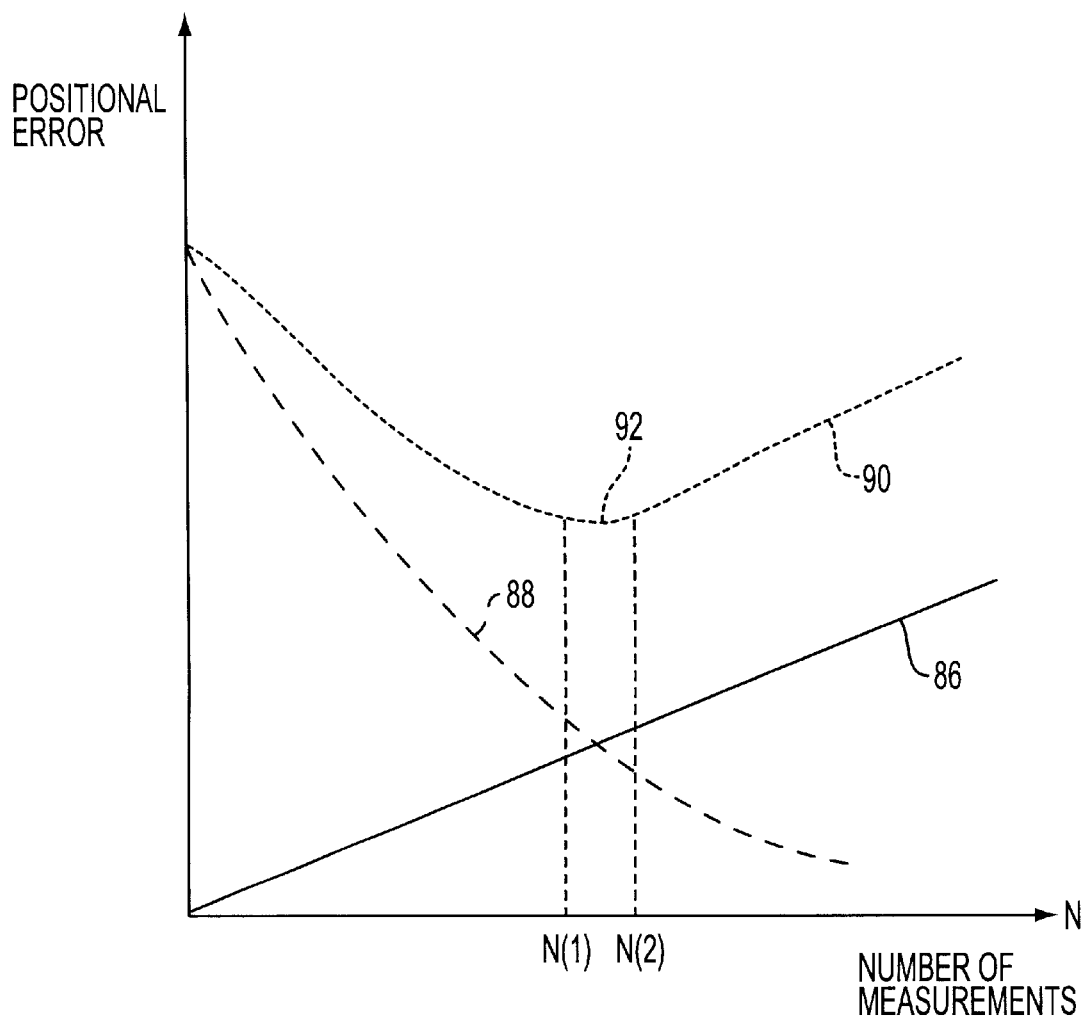
FIG. 11 is a graph showing the derivation of the optimal number of samples for best estimation of position.

FIG. 11 shows a surprising result. If no correction is made for the movement of the earth 14 relative to the nadir 50 of the satellite 10, or of the orbital velocity of the satellite 10 relative to the earth, the actual position of the user terminal 44, as shown in FIG. 11, relative to the satellite 10, steadily increases with time as shown by the solid line 86. Each measurement of the doppler shift and of the delay takes a predetermined period. Accordingly, the positional error as shown by the solid line 86 increases steadily with the number of measurements made.

The positional error, as measured, falls, by well known statistical principles, by the root of the sum of the squares. For example, if a hundred samples are taken, the average error falls to one tenth. If ten thousand samples are taken, the average error falls to one hundredth. If a million samples are taken, the average error falls to one thousandth, and so on. Broken line 88 indicates the falling rate of measured positional error against the number of samples.

The dotted line 90 represents the sum of the broken line 88 and the solid line 86 indicating the actual positional error against the number of samples. It is to be noted that there is a minimum region 92 where the measured positional error is at its least, fewer numbers of measurement producing a greater measured positional error, and greater numbers of measurements also producing a greater measured position error. It is to be observed that the minimum region 92 is quite flat and there are a range of values N(1) to N(2) between which the measured positional error is more or less at a minimum. An optimum number of numbers of measurements may thus be selected between the numbers N(1) and N(2) which will give the best positional estimation. The exact number of optimum measurements depends very much upon the initial measurement error. Returning, briefly, to FIG. 10, the slope of the broken line 88 representing the improvement of positional error in terms of the number of measurements taken, being a square root, it is to be observed that the delay contour lines 82 start off with a relatively small error so that, interpreting the graphs of FIG. 11, a relatively small number of measurements would be required to produce an optimum number of measurements. Conversely, the doppler contours 84, along the ground track is indicated by the horizontal axis 78 are relatively large so that the slope of the broken line 88 is relatively shallow, demanding a relatively large number of measurements to achieve a best estimation of positional error.

Figure 12:
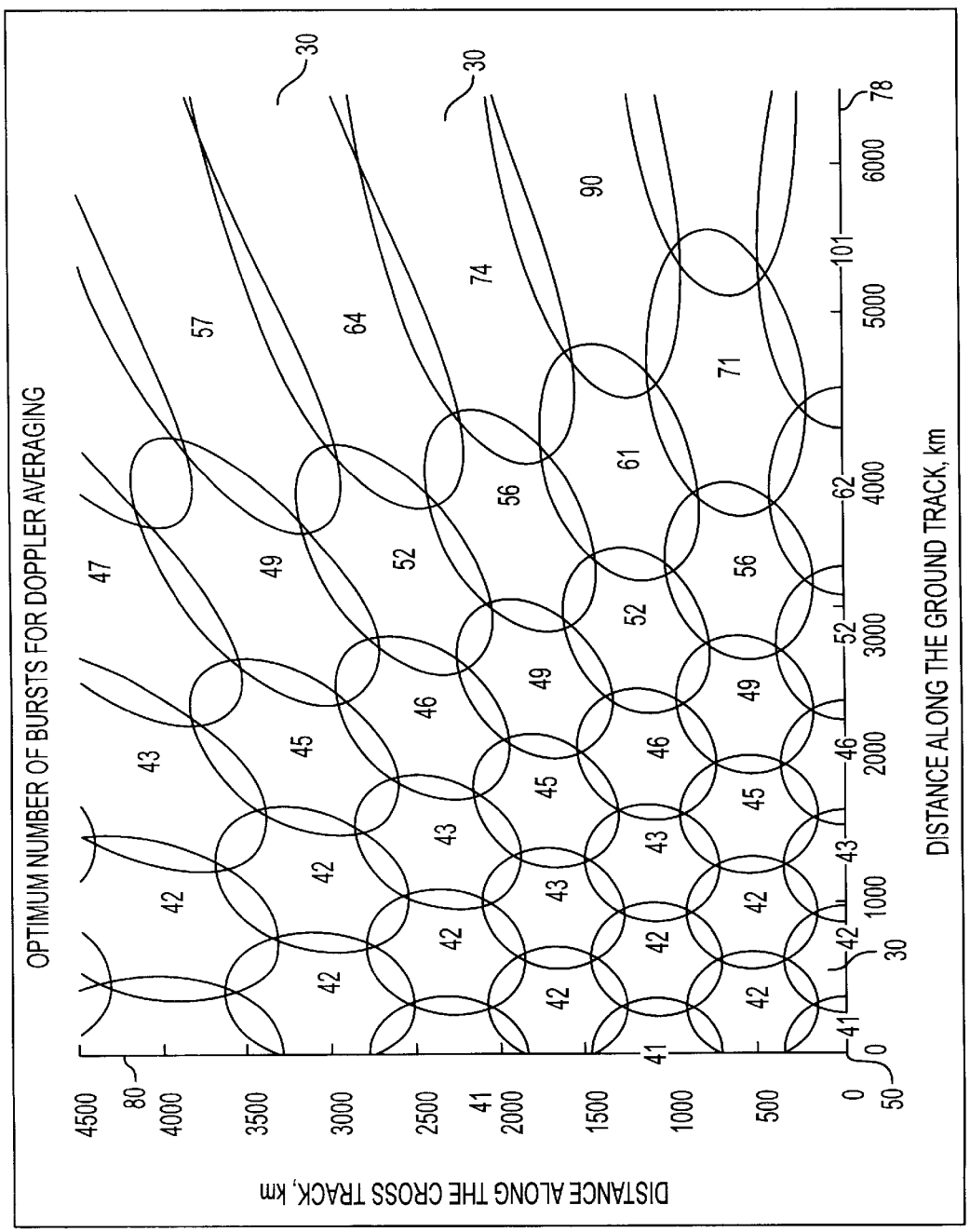
FIG. 12 is a chart showing, for the particular preferred embodiment, the derived optimal number of samples for doppler frequency shift averaging.

FIG. 12 is a first quadrant indication of the optimal number of measurements to be taken for each of the spot beam 30 depending upon the beam in which the user terminal 44 is found, for each of these spot beams 30, for doppler shift measurements, according to the preferred embodiment illustrating the present invention. It will be seen that numbers of optimum measurements range from 90 to 42. If other sampling rates and satellite orbital heights are chosen, other optimum numbers of measurement apply.

Figure 13:
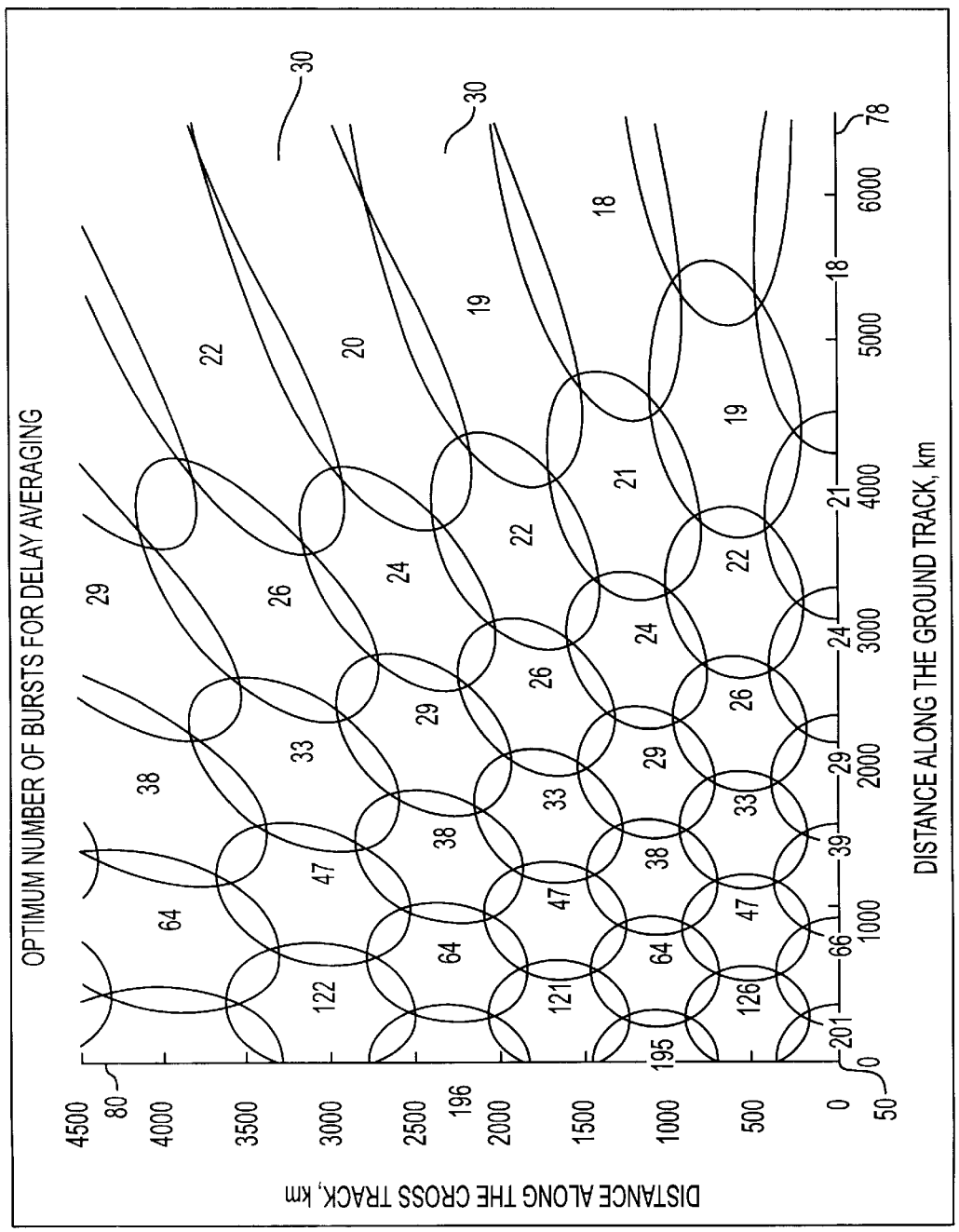
FIG. 13 is a chart showing, for the particular preferred embodiment, the derived optimal number of samples for propagation delay averaging.

Likewise, FIG. 13 shows the optimum number of bursts or samples for each of the spot beams 30 for delay measurements as described with reference to FIG. 6. Surprisingly, the optimum number of samples ranges from 201 near the nadir along the cross track as indicated by the vertical lines 80 and drops to surprising low values at the periphery of the spot beams 30.

The Foregoing description applies to those areas 18, as shown in FIGS. 1 and 4, as having single radio coverage from a satellite 10. The following description applies to those areas 20, shown in FIGS. 1 and 4, where there is multiple radio coverage from the satellite 10.

Figure 14:
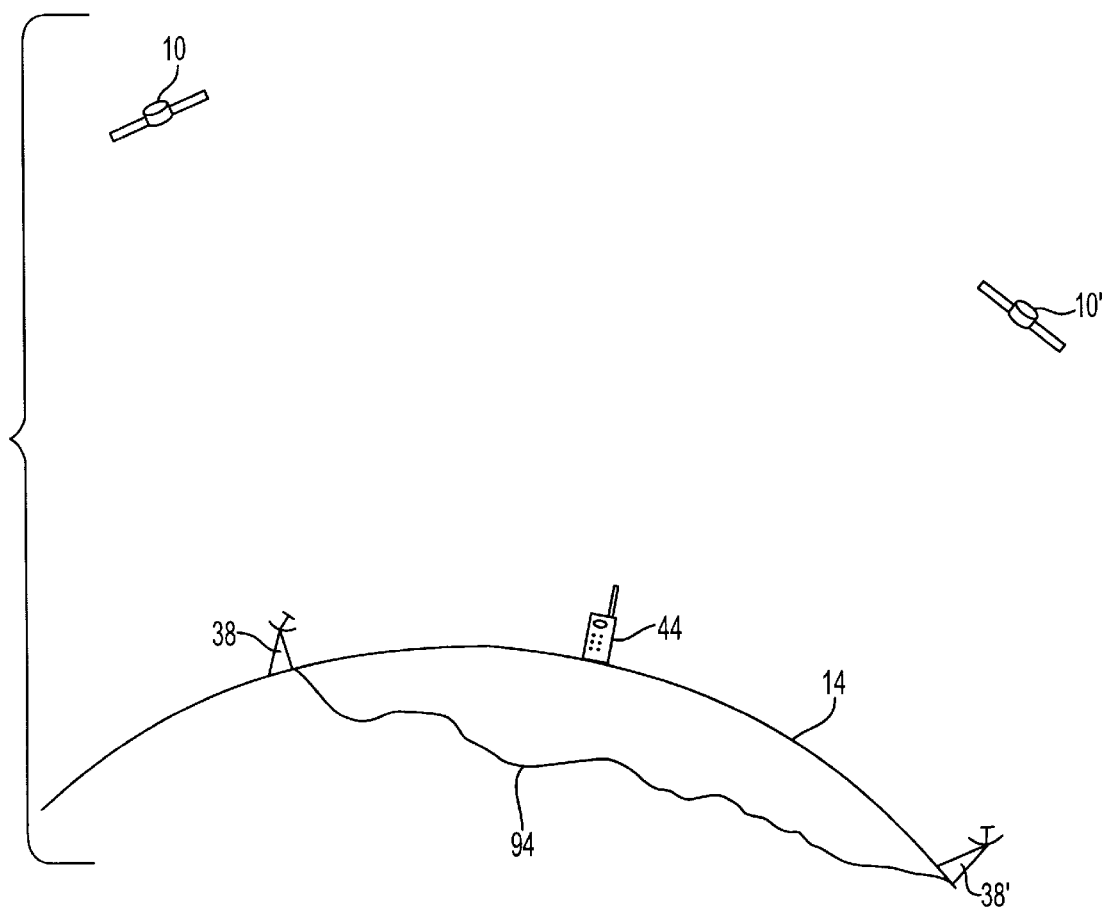
FIG. 14 shows the situation where the user terminal has direct access to more than one satellite.

FIG. 14 shows the situation where the user terminal 44 on the surface of the earth 14 has radio coverage from more than one satellite 10 10'. Ideally, the two satellites 10' should both be visible to the user terminal 44 and to a single earth station 38. However, it is possible that a satellite 10' may be visible of the user terminal 44 but not the single earth station 38. Alternatively, the other satellite 10' will be visible to another earth station 38'. This is not a problem since both earth stations 38 38' may be joined by a ground communication line 94 where data, derived from the satellite 10 10' and the user terminal may be exchanged for one of the earth stations 38 to act as a master in determining the position of the user terminal 44 on the surface of the earth 14.

If more than one satellite 10 10' is visible, or has been visible in the near past, instead of executing a doppler ranging operation as described with reference to FIGS. 7, 8, 9, 10, 11 and 12, a simple time delay measurement is executed as described with reference to FIGS. 6, 10, 11 and 13. An earth station 38 38' sends a signal to each of the satellites 10 10' and, as previously described, and measures the propagation delay between the satellite 10 10' and the user terminal 44.

As earlier described with reference to FIG. 6, the delay measurements generate, as the possible position of the user terminal 44 relative to the satellite 10, a spherical surface, centred on each of the satellites 10 10' which intersect with each other, and with the surface of the earth 14, to give a unique location for the user terminal 44 on the surface of the earth 14, subject to ambiguity resolution, hereinbefore described. If the user terminal is assumed to be on the surface of the earth, only two satellite propagation delays are necessary for absolute location of the user terminal. If more than 3 satellites 10 10' are so used, the user terminal 44 may be absolutely located in space, also allowing for altitude variations on the surface of the earth 14. It is to be noted, with reference to the description of FIG. 10, that the delay contours 82 are considerably more accurate, particularly at extreme range from the nadir 50 along the ground track as indicated by the horizontal likes of 78, than are the doppler contours 84. Accordingly, the method of measurement of the position of the user terminal 44 on the surface of the earth 14 describe with reference to FIG. 14 is more accurate.

Accordingly, the invention concerns itself with, in what manner, the position of the user terminal 44 is to be determined on the surface of the earth 14. Where only one satellite 10 is visible, the ranging method shown in FIG. 10 is employed. When more than one satellite is visible, the position determined method described in relation to FIG. 14 is employed.

Figure 15:
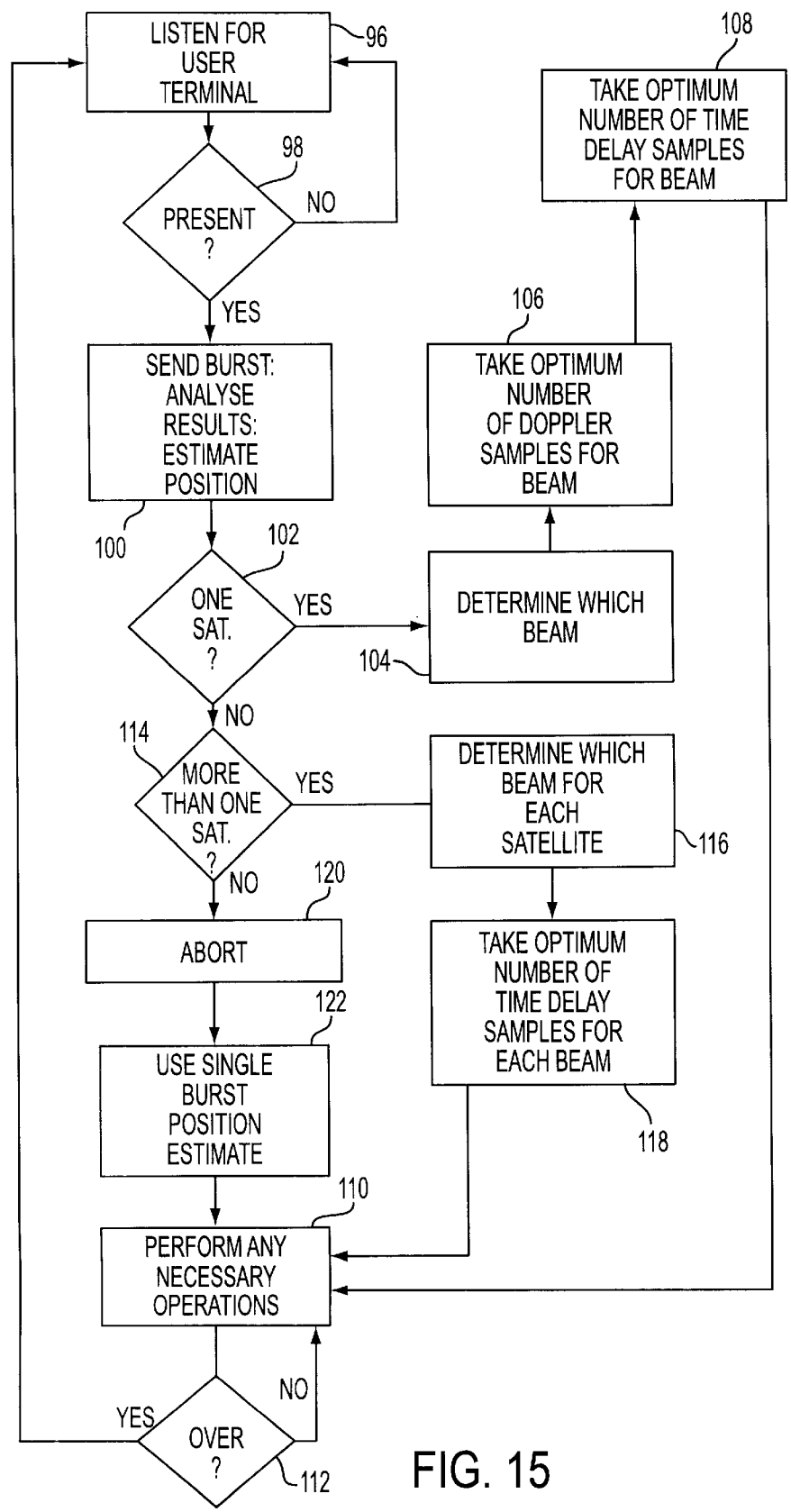
FIG. 15 is a flow chart of the activities of the earth station when determining the position of the user terminal on the surface of the earth employing one satellite, or more than one satellite, if available.

Attention is now drawn to FIG. 15 which shows the activity of the earth station controller 56 in that one of the earth stations 38 38' which executes the position determination for the user terminal 44.

In a first operation 96 the earth station 98 listens for a request of some kind of the user terminal 44. If a first test 98 fails to detect a call from the user terminal 44, control is passed back to the first operation 96. If the first test 98 determines that the earth station 38 has been polled by the user terminal 44, control is passed to a second operation 98. The second operation 98 sends a transmission, via the satellite 10, to the user terminal 44 as described with reference to FIGS. 6, 9 and 10. It is to be presumed that the operation of FIG. 8, where the satellite is "calibrated", has already been executed. If the operation described with reference to FIG. 8 has not been executed, the second operation 100 executes the necessary calibration of the satellite 10.

The second operation 100 also analyses the results from the doppler frequency shift measurement and from the time delay measurement based on one mutual transmission between the earth station 38 and the user terminal 44 to give a guess as to the position of the user terminal 44 on the surface of the earth 44.

The earth station 38, having made an approximate estimate of the position of the user terminal 44, on the surface of the earth, is then in a position to determine whether or not the user terminal 44 will be visible to more than one satellite 10. If a second test 102 decides that only one satellite is visible, control passes to a third operation 104 which determines which one out of the plurality of spot beams 30 is occupied by the user terminal 44. This information may also be known by the earth station 38 based on which of the spot beams 30 the signal from the user terminal 44 was received.

Control passes from the third operation 104 to a fourth operation 106 where, with reference to FIG. 12 on its associated description, depending upon which spot beam 30 is occupied by the user terminal 44, the optimum number of samples by message exchange is executed. This gives the greatest provision in position determination as described with reference to FIG. 11.

When the fourth operation 106 has performed its necessary function, control passes to a fifth operation 108 where delay measurements are made, as described with reference to FIG. 6, for the optimum number of samples for delay measurement as described with reference to FIGS. 11 and 14.

The fourth 106 and fifth operations 108 may be conducted simultaneously, the number of sampling instance being the larger of which ever is greater for doppler shift or delay measurement as shown as reference to FIGS. 12 and 13 for a particular spot beam 30, and the result being analyzed for the lesser number only up to the smaller number required, later results being discarded.

The sum of the function of the fourth operation 106 and the fifth operation 108 is to give the best estimate, based on the style of position analysis described with reference to FIG. 10 where spheres of constant time delay and cones of constant doppler shift intersect the surface of the earth 14.

At termination of the fifth operation 108, control is passed to a sixth operation 110 where any necessary communications operation is executed. This may comprise a telephone call, a request for updating of position and status, or whatever else may be required. If a third test 112 depicts that the necessary operation of the sixth operation 110 is terminated, control returns to the first operation 96 where the earth station 38 once again listens for the user terminal 44 through the satellite 10.

Returning to the second test 102, it has been detected that there is just not a single satellite, control is passed to a fourth test 114 which determines if there is more than one satellite present. If the fourth test 114 detects that there is a plurality of satellites 10 available, control passes to a seventh operation 116 where the earth station 38 via the earth station controller 56, determines for which of the plurality of spot beams 30 for each satellite the user terminal 44 is accessible. Thereafter, control passes to an eighth operation 118 where the earth station 38 exchanges the optimum number of radio bursts for each satellite 10 according to FIG. 6 and its associated description, and according to FIGS. 10 and 13 and their associated description. Once the position of the user terminal 44 has been determined by the eighth operation 118, control passes to the sixth operation 110 and thereafter as earlier described, back to the first operation 96.

If the fourth test 114 finds no satellites available, an unusual situation but none the less possible due to environmental blockage, control passes to a ninth operation 120 where the overall operation is aborted. Control then passes to a tenth operation where the earth station 38 assumes the rough position of the user terminal 44 based on the single burst doppler shift and delay measurements executed in the second operation 100.

After the tenth operation 122, control passes to the sixth operation 110 which performs any necessary operations, which, in this instance, might be for the earth station 38 to attempt to establish contact with the user terminal 44, or, perhaps, even to do nothing.

Control then passes back to the first operation 96.

Figure 16:
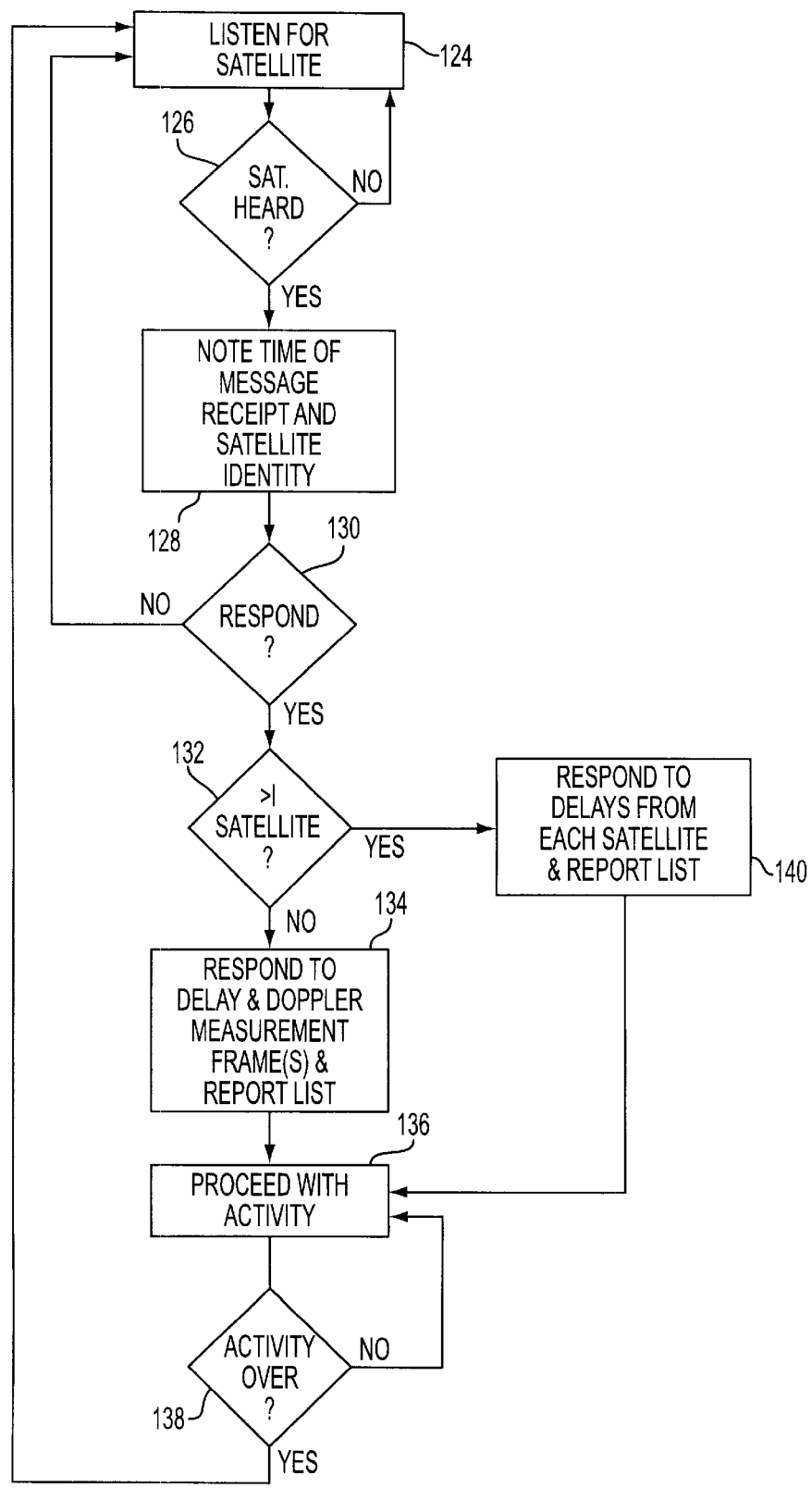
FIG. 16 is a flow chart showing how the earth station can incorporate timed broadcasts in determining the position of the user terminal on the surface of the earth.

FIG. 16 shows the activity of the user terminal 44 as it co-operates with the earth station 38 in yet a further alternative for locating the user terminal 44 in the surface of the earth 14.

The individual satellites 10, at periodical intervals, send out broadcast messages, on all of the spot beams 30, intended to be received by all user terminals 44. The broadcast message, from each satellite, originates originally, from an earth station 38 and contains information which identifies from which satellite the broadcast message is emanated. The time of transmission of the broadcast message is accurately known because, as described with reference to FIG. 6, the earth station is aware of the precise distance between itself and the satellite 10. Equally, as shown in FIG. 14, different earth stations 38' can instruct different satellites 10' to provide a broadcast message. Each earth station 38' is aware of the position of the satellite 10 at all times and will also be aware of the identity of the earth station 38 38' from which the broadcast message originated. As an alternative, the broadcast message can also include indication from which earth station it originated.

In any event, it is merely necessary to note the time of arrival of a broadcast message at a user terminal 44, and to know from which satellite 10 it originated, in order, effectively, to do a ranging "propagation delay" measurement on the user terminal 44 from the satellite 10. Once again, a sphere of fixed delay, in terms of distance, describes the potential locus of the user terminal 44 about the central satellite 10, and the user terminal 44 can lie on the line of intersection of the sphere centred on the satellite 10, with the surface of the earth 14.

Returning once again to FIG. 16, the user terminal, in an 11th operation 124, listens for the broadcast messages from the satellites 10 until a fifth test 126 detects that a satellite has been heard. Control then passes to a 12th operation 128 where the user terminal, using an internal clock, notes and stores the instant of receipt of the message from the satellite 10 together with the identity of the particular satellite 10 from which the message originated. The user terminal 44 keeps a record of the last several satellites 10 to be heard.

Control then passes to a sixth test 130 which checks to see if the user terminal 44 is required to respond to the satellite 10. If no response is required, control passes back to the 11th operation 124 where the user terminal once again listens for broadcast messages from the satellite 10.

If the sixth test 130 determines that the user terminal 44 is required to respond in some manner, perhaps for communications or registration purposes, control passes to a seventh test 132 which checks to see if only one satellite 10 is visible, or more than one satellite 10 is visible. This can be established from the list compiled in the 12th operation 128.

If the seventh test 132 detects that there is only one satellite visible, control passes to a thirteenth operation 134 where the user terminal 44 responds to delay and doppler measurements as indicated with reference to FIGS. 6 to 13. The user terminal 44 also sends, to the earth station 38 the list of times and identities of heard satellites 10 which was accumulated by the 12th operation 128.

The earth station controller 56 then combines all of these measurements and will know the position of the user terminal 44 on the surface of the earth 14. Control next passes to a fourteenth operation 136 where the user terminal 44 proceeds with whatever activity is required of it until an eighth test 138 detects that the activity is over and passes control back to the eleventh operation 124 where the user terminal 44 listens for messages from the satellites 10.

If the seventh test 132 detects that more than one satellite present, control passes to a fifteenth activity 140 where the user terminal 44 responds to a propagation delay measurement from each of the satellites 10 10' as described with reference to FIGS. 14 and 15. The user terminal 44 also reports, to the earth station 38, the contents of the list accumulated in the twelfth operation 128 during the time of receipt and identity of satellite broadcast messages.

At this point, the earth station 38 with which the user terminal 44 is interactive will have sufficient information to determine the position of the user terminal 44 along the surface of the earth 14.

The fifteenth activity 140 having being completed, control passes to the fourteenth activity 136 which proceeds with whatever activity the user terminal is required to perform and then, via the eighth test 138, returns control to the eleventh operation 124 where the user terminal 44 continues to listen to broadcast messages from satellites 10.

It is to be noted that, if there are sufficient readings listed by the twelfth operation 128 and the user terminal 44 has not been moving any significant distance over time, then the position of the user terminal 44 on the surface of the earth 14, may adequately and accurately be measured simply on the basis of the record accumulated by the twelfth operation 128 thus dispensing with the necessity in the fifteenth activity 140 to measure delays from each visible satellite or, in the thirteenth activity 134 to perform a doppler measurement together with a delay measurement.

Equally, in the thirteenth activity 134, if the combined propagation delay and Doppler frequency shift measurement produces a location which roughly corresponds to the location resulting from intersection of the spheres of constant delay as determined from the list of broadcast receipt times and satellite identities as collected by the twelfth operation 128, and this latter determination is more accurate, then the earth station 38, through its earth station controller 56, can opt to use the latter determination.

Another extremely significant element of the compilation of the list by the twelfth operation 128 and its being reported by the thirteenth operation 134 and the fifteenth activity 140 is very simply that the position of the user terminal 44 on the surface of the earth, can be measured using satellites 10 which are no longer visible to the user terminal 44. This is in contrast to all other methods which require that a satellite 10, used for a position determination, should be visible to the user terminal 44.

The user terminal 44 comprises an internal clock. This clock, of course, has relative inaccuracies. The earth station 38, in combination with the earth station controller 56, possess a very accurate clock. In order for the earth station 38 properly to use the list gathered by the 12th operation 128, it is necessary to correct the errors in the clock on the user terminal. This is very simply done. The earth station 38, at a first known instant, requests the user terminal 44 to indicate the time, on its clock to the earth station 38. The earth station 38 knows the propagation delay between itself and the user terminal 44. The time of response, by the user terminal 44, is thus very accurately known. Having noted what time the user terminal clock believes it to be, the earth station 38 and the earth station controller 56 wait for a predetermined period, perhaps one second, and request that the user terminal 44 once again tells the earth station 38 what time the user terminal thinks it is. The earth station 38 thus has two readings from which the rate of drift of the clock on the user terminal 44 and the accumulated timing error can be determined. The earth station 38, with the earth station controller 56, can thus extrapolate using the known drifts and errors, the times recorded in the list generated by the twelfth operation 128. The corrected times are then compared with the known times of transmission from each satellite 10 of the particular broadcast messages. The earth station controller 56 can then calculate the propagation delay between each satellite and the user terminal. Since the position of each satellite is accurately known, it is possible to determine the range of the user terminal 44 from the particular satellite which did the broadcasting.

The previously described measures can be used singly, multiply or in any combination to determine the location of the user terminal 44 on the surface of the earth 14. If two satellites are visible, the present system also includes the possibility of using a doppler frequency shift measurement from each of the satellites to determine the position of the user terminal 44.

The description of the preferred embodiment has, to this point, concerned itself with illustrating just a few techniques for measuring the position of a user terminal. This is intended to convey the environment within which the invention functions. Whatever method of terminal 44 position measurement is employed, the accuracy is dependent upon a knowledge of the position of the satellite 10. The following description concerns itself with the heart of the invention, where the position of the satellite 10 is known with improved accuracy, thereby improving accuracy of measurement of the position of a user terminal 44.

Figure 17:
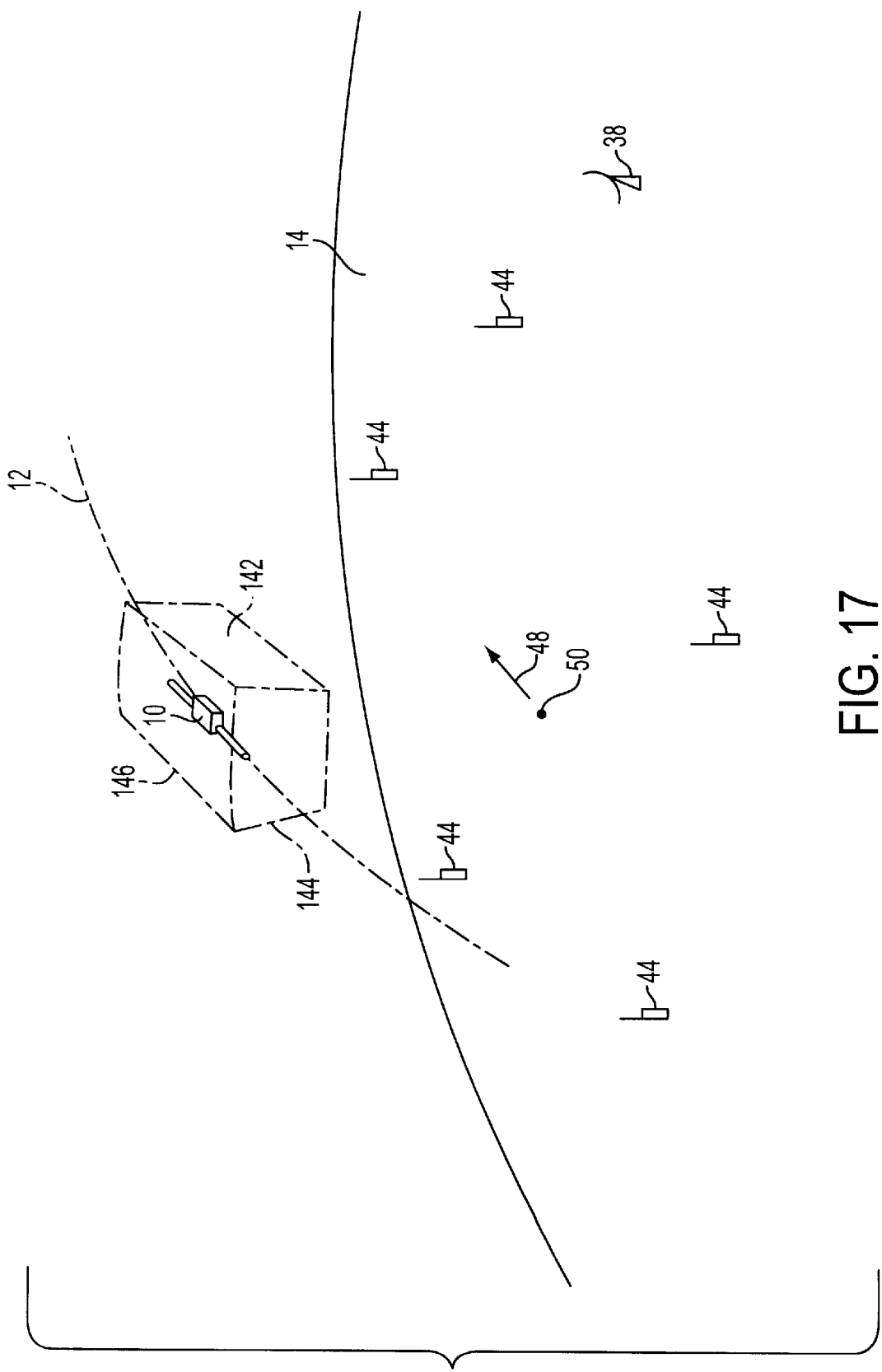
FIG. 17 is a diagram showing how the plurality of user terminals on the surface of the earth can be used, in the present invention, to improve the accuracy of measurement of the position of the satellite.

FIG. 17 shows the disposition of a satellite 10, above the earth 14, in communication with an earth station 38 and a plurality of user terminals 44.

It has previously been stated that the earth station 38 is aware, with precision, of the position, at any instant, of the satellite 10 in its orbit 12. In fact, there is always an uncertainty in the position of the satellite 10. The satellite 10 exists within a box of uncertainty 142 where there is a radial uncertainty 144 and a circumferential uncertainty 146. In a GPS system, these uncertainties are resolved, with costly and accurate equipment, to within a few metres. With communications satellites 10, the uncertainties can be as large as hundreds or even thousands of metres. If it is desired to measure the position of a user terminal 44 on the surface of the earth 14, it is extremely desirable to reduce these uncertainties of communications satellite 10 position, and with minimal additional cost, effort and equipment.

The user terminals 44 are disposed on the earth 14 all about the nadir 50. Some user terminals 44 are ahead of the nadir 50, some behind, some to the left and some to the right. In use, the satellite 44 can be in contact with many hundreds or thousand of user terminals 44. All of the user terminals 44 need not be in use for voice calls or data communication, but, in normal operation, will periodically update their position. In operation, from time to time, each user terminal either interrogates the earth station via the satellite 10 or the earth station 38 interrogates each user terminal 44 via the satellite. These interrogations occur even when the user terminals 44 are not being used for communication and are simply required to allow the earth station to be aware of the presence of each user terminal 44 within range of any particular satellite 10.

On each occasion of mutual interrogation, be it from the user terminal 44 to the earth station or from the earth station 38 to the user terminal 44, the position of the user terminal 44 is measured, using any of the techniques described with reference to FIGS. 1 to 16. Each of these techniques involves at least one measurement of propagation delay between the satellite 10 and the particular user terminal being interrogated. Whatever method is used, an estimate of the position of the particular user terminal 44 is made, which may have a low error if the user terminal is well placed, all the way up to a high error if the user terminal 44 is in a disadvantageous position.

Initially, the position of the satellite 10 is measured using solid triangulation, for example, one method can use at least three earth stations 38 to form a three dimensional tetrahedron with three vertices on the surface of the earth 14 and the apex at the satellite 10. Other methods can use two earth stations 38 and more than one instance of measurement from at least one of the two earth stations. Yet another method can employ just one earth station making a series of measurements over time. It is not the subject of the present invention exactly how the initial estimation of the position of the satellite 10 is made. It is simply enough that the inial estimation is, indeed, made. On the negative side, the earth station 38 or stations 38 may not be ideally located at the instant or instants of measurement, creating a difficult geometry and leading to the box of uncertainty 142.

The present invention seeks to employ the user terminals 44 to give a much improved knowledge of the position of the satellite 10. In other words, the measurements of the positions of the user terminals 44 are employed to reduce the size of the box of uncertainty 142.

In effect, each measurement of the position of a user terminal 44 is employed, with many other measurements of the positions of other user terminals 44 to improve the measurement of the position of the satellite 10.

Instead of just a tetrahedron between three earth stations 38, or any of the other methods of establishing the position of the satellite 10 using an earth station 38 or stations, literally hundreds or thousands of points are used, being the location of the many user terminals 44, to form a polyhedron, with a vertex at each user terminal 44 and its apex at the satellite 10. In addition, the contributions of each user terminal 44 to the overall estimation of the position of the satellite 10 are weighted according to the size of their potential error, which includes an estimation of the error in the measured position of the user terminal 44 and an allowance for the difficulty of the geometry which may exist from the position of a particular user terminal 44.

The position of the satellite 10 (Sat) is a function (F) of the position of the user terminal (Ut) and of the earth station (Es). The present invention continuously updates the satellite 10 position measurement. If the nth User terminal has an estimated position Ut(n), and the earth station remains fixed, the functionality can be expressed as:

$$Sat(n)=F(Ut(n), Es)$$

At the beginning, only the estimation of the satellite 10 position from the earth stations 38 is available so that:

$$Sat(0)=F(Es)$$

When the first result from a user terminal 44 is received the relationship becomes:

$$Sat(1)=F(Ut(1), Es)$$

and so on.

But the estimation of the position of the user terminal Ut(n) improves with each improvement in the estimation of the position of the satellite 10 Sat(n). In fact, the position of the user terminal also has a functional relationship P, given by $$Ut(n+1)=P(Sat(n), Es)$$

The relationships provide that, as each estimation is received for the satellite 10 position Sat(n), the improved Sat(n) is incorporated in the next measurement.

It has earlier been stated that the results for the position estimation of each user terminal 44 are weighted according to the estimated error in the user terminal 44 position estimation. This is simply achieved by passing each result for the position of each measured user terminal 44, together with the latest, improved estimate of the satellite position, into a Kalman filter algorithm as a state variable.

This invention represents an improvement over GPS systems in that the GPS system has no access to the actual position of the GPS terminals, since communication is solely one-way from the GPS satellite to the terminal, the GPS terminal being entirely passive.

In the preferred embodiment of the present invention, the calculation of the position of the satellite 10 is performed at an earth station 38, namely the earth station 38 which is in contact with the plurality of user terminals 44 via the satellite 10. This information is shared with other earth stations 38 which may, currently or at some future time, need to access the particular satellite 10. It is to be recalled that orbital characteristics of each satellite 10 10' are calculable to contribute to any initial estimation of the position of the satellite 10 10'. The improved estimation of the actual location of the satellite 10 10' can be used further to tighten and minimise the box of uncertainty 142 so that subsequent earth stations 38 and user terminals 44 can benefit, by using an improved initial value for the position of the satellite 10, from the previous improvements in measurement achieved by other earth stations 38 and other sets of user terminals 44.

Although the preferred embodiment of the present invention shows the calculations being made at an earth station, there is nothing to stop the satellite 10 10' itself from performing the calculations and making the results available as and where necessary.

Equally, although all later updates on the satellite 10 position have been described as originating from estimations of the position of a plurality of user terminals 44, there is nothing to prevent additional positional information from other earth stations 38 from similarly being incorporated.

What is claimed is:

1. A system for estimating a position of a satellite of a mobile communication system at a particular instant of time wherein said satellite is operable to cooperate with an earth station to measure and record the position of a terminal on the surface of the earth by reference to an estimated, instant position of said satellite, said earth station being operable to estimate said instant position of said satellite with a first accuracy, wherein said system is operable to incorporate the measured position of said terminal to make a re-estimation of said instant position of said satellite with a second accuracy, said second accuracy being greater than said first accuracy.

2. A system according to claim 1 operable to employ the result of said re-estimation as the new estimated instant position of said satellite when next operable to measure the position of said terminal.

3. A system according to claim 1 wherein said terminal is one of a plurality of terminals, and wherein said system is operable to measure and record the position of each of said plurality of terminals and to incorporate the measured position of each of said plurality of terminals to execute said re-estimation in each instance.

4. A system according to claim 3 wherein said plurality of terminals can incorporate one or more other earth stations.

5. A system according to claim 1 operable, in said re-estimation, to incorporate a weighting to the significance of the accuracy and geometry of the measurement of the position of said terminal, and to employ said weighting to give greater favour to those measurements of position of said terminal which contribute most to improving the accuracy of estimation of the instant position of said satellite.

6. A system according to claim 5 wherein said weighting is incorporated in said re-estimation by providing said accuracy of measurement and said geometry as state variable inputs to a Kalman filter algorithm.

7. A system according to claim 1 wherein said earth station is one of a plurality of earth stations, each of said plurality of earth stations sharing information concerning said re-estimation.

8. A method for estimating a position of a satellite of a mobile communication system at a particular instant of time for use in a system wherein said satellite is operable to cooperate with an earth station to measure and record the position of a terminal on the surface of the earth by reference to an estimated, instant position of said satellite, said earth station being operative to estimated said instant position of said satellite with a first accuracy, said method including the step of incorporating the measured position of said terminal in a re-estimation of said instant position of said satellite with a second accuracy, said second accuracy being greater than said first accuracy.

9. A method according to claim 8 including the step of employing the result of said re-estimation as the new estimated instant position of said satellite when next said system is operable to measure the position of said terminal.

10. A method according to claim 8 wherein said terminal is one of a plurality of terminals, and including the steps of measuring and recording the position of each of said plurality of terminals and incorporating the measured position of each of said plurality of terminals and executing said re-estimation in each instance.

11. A method according to claim 10 including the step of including, in said plurality of terminals, one or more other earth stations.

12. A method according to claim 8 including the steps of including, in said re-estimation, a weighting to the significance of the accuracy and geometry of the measurement of the position of said terminal, and employing said weighting to give greater favour to those measurements of position of said terminal which contribute most to improving the accuracy of estimation of the instant position of said satellite.

13. A method according to claim 12 including the step of including said weighting is in said re-estimation by providing said accuracy of measurement and said geometry as state variable inputs to a Kalman filter algorithm.

14. A method, according to claim 8 wherein said earth station is one of a plurality of earth stations, and including the step of each of said plurality of earth stations sharing information concerning said re-estimation.

\* \* \* \* \*